United States Patent [19]

Taneya et al.

[11] Patent Number: 5,457,561

[45] Date of Patent: Oct. 10, 1995

[54] SYSTEM FOR TRANSMITTING A BEAM IN THE AIR

[75] Inventors: Mototaka Taneya, Nara; Seiki Yano, Yamato-Koriyama; Haruhisa Takiguchi, Nara; Atsushi Shimonaka, Ikoma; Tatsuya Morioka, Tenri; Hidenori Kawanishi, Nara, all of Japan

[73] Assignee: Sharp Kabushiki Kaisha, Osaka, Japan

[21] Appl. No.: 101,080

[22] Filed: Aug. 4, 1993

[30] Foreign Application Priority Data

Aug. 10, 1992 [JP] Japan .................................... 4-212648
Jul. 22, 1993 [JP] Japan .................................... 5-181266

[51] Int. Cl.$^6$ ................................................ H04B 10/00
[52] U.S. Cl. .......................... 359/172; 359/152; 359/191
[58] Field of Search ........................................ 359/109, 154, 359/159, 162, 168–170, 172, 190–191, 193, 152; 250/201.1, 203.3; 356/129.1, 152.1, 153, 138

[56] References Cited

U.S. PATENT DOCUMENTS

| 3,970,839 | 7/1976 | Javan | 359/162 |
| 5,249,072 | 9/1993 | Ichimura et al. | 359/191 |

FOREIGN PATENT DOCUMENTS

| 63-052528 | 7/1988 | Japan . |
| 3046839 | 2/1991 | Japan . |
| 4074030 | 3/1992 | Japan . |
| 3-151546 | 6/1992 | Japan . |

OTHER PUBLICATIONS

"Current State and Future of Optical Communication Technique," edited by Electric Communication Technique Council, 1987.
Conference Digest, 12th IEEE International Semiconductor Laser Conference, E-7, pp. 72–73, Y. Nakano et al.
"O plus E" Jan., 1980, pp. 82–131.
"Electric Communication Society Journal" Aug. 1986, pp. 816–823.
Koji Goto et al, *Effects of Antenna Pointing Errors on the Design of Heterodyne Optical Intersatellite Communications*, Institute of Electronics, Information and Communication Engineering pp. 279–286, Jun. 1990, Tokyo Japan.
Goodwin et al, "Optical Heterodyne Communications Experiments at 10.6μ", IEEE Journal of Quantum Electronics, pp. 612–617, vol. 4, No. 10, Oct. 1968, New York.
Leeb, "Heterodyne and Homodyne Detection in Optical Space Communications", Optical Space Communication Apr. 1989, Paris FR, pp. 216–227.

*Primary Examiner*—Leo H. Boudreau
*Assistant Examiner*—Kinfe-Michael Negash
*Attorney, Agent, or Firm*—Nixon & Vanderhye

[57] ABSTRACT

A system for transmitting information with a coherent beam being propagatable in the air is arranged to include a transmitting device having a modulator and an emitting circuit and a receiving device having a generator, a mixer, a frequency discriminating circuit, and reproducing circuit. The modulator modulates a reference light frequency (wavelength) or phase of a coherent beam to be emitted from a light source according to the signal. The emitting circuit emits the modulated beam as a divergent beam having such a power density as being safe to human eyes. The generator generates a coherent locally oscillated beam. The mixer mixes the signal beam with the locally oscillated beam and photoelectric-converts the mixed beam. The frequency discriminating circuit frequency-discriminates the a.c. component of the photoelectric-converted output. The reproducing circuit reproduces a signal from the output of frequency discriminating circuit. Any one of the transmitting device and the receiving device has a function of keeping a relative light frequency difference (wavelength difference) between the signal beam and the locally oscillated beam constant.

8 Claims, 18 Drawing Sheets

SYSTEM FOR TRANSMITTING A BEAM IN THE AIR

BACKGROUND OF THE INVENTION

1. Field of the Invention

The present invention relates to a system for transmitting a beam in the air, and in particular to a system for transmitting a beam in the air, which is based on the transmitting method using coherency of a laser beam.

2. Description of the Related Art

As electronic devices have been made more and more wireless, a system for transmitting a medium like light or a microwave in the air has been more requested. Further, considering that the needs for information about a moving image may go high, it is essential to speed up such a system and increase the volume of the information to be transmitted by the system (as an example of a digital signal, a transmission speed=10 to 600 Mbps: the number of bits to be sent or received as a digital signal per second). Of the transmitting media, transmission of a beam in the air may be applied in the wide range of a small-scaled wireless LAN, AV equipment and image communication equipment, because the transmission is not restricted by the laws unlike the transmission of microwaves. It is expected that the beam may convey a greater amount of information by transmitting in the air instead of through other media.

In the conventional system for transmitting a beam in the air for civilian use, which may be used in any living place, a system is provided to have a light-emitting diode as a light source. Such a system applies to a remote controller for electric household appliances or a domestic LAN operating at a relatively low speed (600 Kbps or lower). The summary of the conventional system for modulating a beam in the air has been discussed in detail in pp. 94 to 100 of "Current State and Feature of Optical Communication Technique" edited by Electric Communication Council in 1987. The system configuration of this example is shown in FIG. 13.

A transmitting side is arranged to have an LED 111 and an LED driver 112 and to modulate an intensity of the ray of light sent from the LED 111 according to the signal to be transmitted and emit the modulated light in the air 113. On the other hand, the receiving side is arranged to have a lens 114, a light detection element 115, and a signal processing circuit 116. In the receiving side, the transmitted intensity-modulated light is condensed on a light receiving surface of the light detection element 115 through the effect of the lens 114. The light intensity is converted into an electric signal. The electric signal is amplified and shaped by the signal processing circuit 116 for obtaining a desired signal. An example of a light signal waveform used in the conventional system for transmitting a beam in the air is shown in FIG. 14. The signal is represented as a time change of the intensity of light propagated through the air. A detecting mechanism operates to directly detect the intensity of the light signal. That is, this conventional system may be referred to as an intensity modulating (IM modulation)—direct detecting system with light as a medium.

In the high-speed optical transmission, the time width (pulse width) of a transmitted light pulse is made narrower according to the signal. This results in inevitably reducing a light power per one pulse. The minimum acceptance sensitivity (number of photons per one pulse for securing the lowest S/N ratio required for demodulating a signal in the receiving side) in the IM modulation—direct detecting system shown in FIG. 13 is about $10^4$ to $10^5$ photons/pulse. Assuming that the LED 111 has a luminous wavelength of 800 nm, a light output power of 200 mW, an emitting angle of ±60°, a distance between the transmitting side and the receiving side is 5 m, a condensing efficiency is 5 times, and an effective acceptance area of the light detection element is 2 mm, the possible transmitting speed is at most 1Mbps. Such a low transmitting speed makes it impossible to transmit a high-definition moving image correctly from a visual point of view if a data compressing technique may apply to the transmitting system.

To make the conventional transmitting system operate at high speeds, it is necessary to increase the light output power of the transmitting side. To realize the transmitting speed of about 10Mbps or more, the required light output power is ten times as large as the current intensity (2 W). The LED cannot cope with such a high light output power. That is, the prior art has no capability of increasing the transmitting speed and distance of a beam in the air.

Another problem about the transmission of a beam in the air entailed in the prior art is that background light (skylight or room lighting) is incident to the light detection element as noises. Under such a circumstance, the conventional transmitting system is not usable. This results from the fact that the LED for emitting a signal beam used in the conventional system for transmitting a beam in the air emits an incoherent beam and the emitted beam lacks monochromaticity. This is because since the light (background light) in the natural world is also incoherent light, the background light existing in the same wavelength-area as the signal beam cannot be separated from the signal beam and since the signal beam has a relatively wide spectrum, the power of the background light mingled as noises is inevitably made larger.

As described above, the conventional transmitting system for civilian use of the IM modulation—direct detecting type has the following problems:

(1) It cannot realize the large transmitting capacity necessary to transmit information such as a high-definition moving image by transmission of a beam in the air.

(2) Where strong background light such as skylight exists, the signal beam is offset by the background light. Hence, the signal beam cannot be practically demodulated.

SUMMARY OF THE INVENTION

It is an object of the present invention to provide a system for transmitting a beam in the air for civilian use which is capable of solving the foregoing problems and transmitting information such as a high-definition moving image by wireless.

In carrying out this and other objects, the present invention is a system for transmitting a beam in the air, the system serving to transmit information by modulating a light frequency or a phase of a coherent beam being propagated in the air. The system for transmitting a beam in the air is characterized by:

a transmitting device having means for generating a signal beam by modulating the wavelength or the phase of the coherent beam according to a signal to be transmitted and means for emitting the signal beam as a spherical divergent light wave;

a receiving device having means for generating a coherent locally oscillated beam, photo detection means for mixing the signal beam with the locally oscillated beam and receiving the mixed beam, frequency discriminating means for detecting a light frequency difference between the signal beam and the locally oscillated beam from the output sent from the photo detection means, and means for reproducing a signal from the output sent from the frequency discriminating means; and relative wavelength tuning means for controlling the wavelength of the locally oscillated beam or a reference wavelength of the signal beam to hold the difference between a reference wavelength of the signal beam and a wavelength of the locally oscillated beam at a predetermined value, the tuning means being provided in any one of the receiving device and the transmitting device.

The transmitting device may further have time setting means for setting a time for wavelength tuning, and switching means for keeping a signal to be applied to the signal beam generating means at a constant value during the time set by the time setting means. In this case, the receiving device may further have means for extracting the time for wavelength tuning from the reproduced signal, wavelength difference detecting means for detecting a difference between the output of the frequency discriminating means and a set voltage during the time output from the time extracting means, and control means for controlling a driving condition of a local oscillating laser element to keep the output of the wavelength difference detecting means as a constant value.

Also, the receiving device may further have an average frequency difference detecting means for taking an average of the output from the frequency discriminating means on time and outputting a voltage corresponding to the average value of the frequency difference, a mark factor detecting means for generating a voltage corresponding to a mark factor of the reproduced signal sent from the means for reproducing a signal, means for generating a reference voltage according to the detected mark factor, means for generating a control voltage corresponding to the difference between the reference voltage and the average value of the frequency difference, and control means for controlling a driving condition of a local oscillating laser element according to the control voltage.

Also, the receiving device may further have means for emitting part of the locally oscillated beam as a divergent light wave in the air. In this case, the transmitting device may further have photo detection means for mixing the locally oscillated beam with the signal beam and receiving the mixed beam, frequency discriminating means for detecting a light frequency difference between the locally oscillated beam and the signal beam from the output from the photo detection means, means for detecting a light frequency difference between the locally oscillated beam and the reference beam of the signal beam from the output of the light frequency discriminating means, and control means for comparing the light frequency difference signal with the reference signal and controlling the reference wavelength of the signal beam to keep the compared difference constant.

The transmitting device operates to modulate a reference frequency or phase of a coherent beam emitted from the light source according to the signal, and emit the modulated beam as a divergent beam having such a power density as being safe to human eyes. The receiving device operates to generate the coherent locally oscillated beam, mix the signal beam with the locally oscillated beam, perform photoelectric conversion with respect to the mixed beam, discriminating a.c. components of the photoelectric converted output, and reproduce a signal from the discriminated output. Any one of the transmitting device and the receiving device keeps the relative light frequency difference between the signal beam and the locally oscillated beam constant.

Further objects and advantages of the present invention will be apparent from the following description of the preferred embodiments of the invention as illustrated in the accompanying drawings.

DESCRIPTION OF THE PREFERRED EMBODIMENTS

Figure 1:
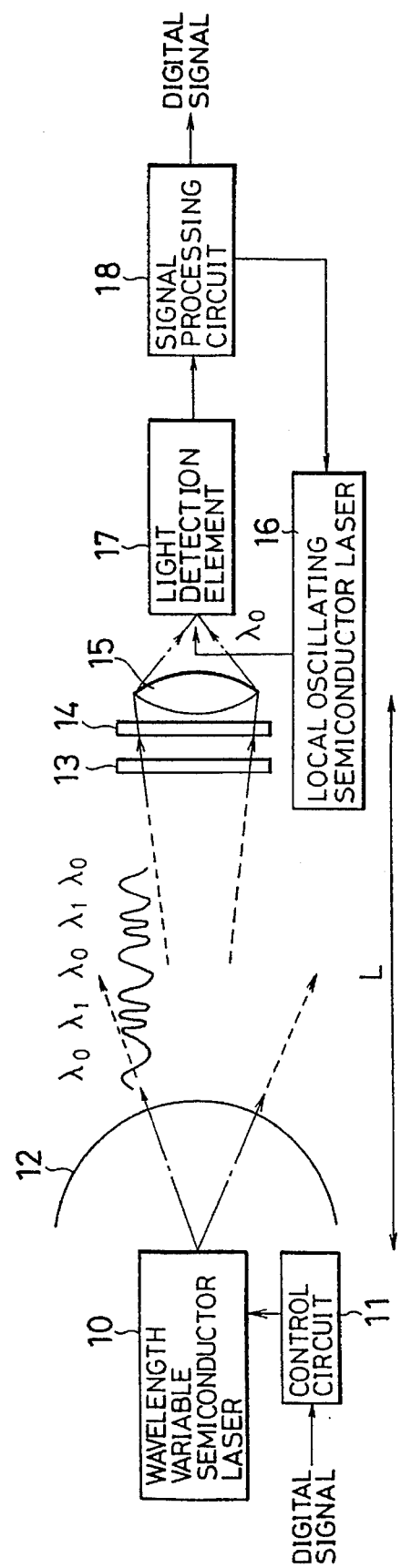
FIG. 1 is a diagram showing a system for transmitting a beam in the air according to a first embodiment of the present invention.

A first embodiment of the invention will be described in detail as referring to the drawings, in which embodiment the invention is applied to a system for transmitting a digital signal. FIG. 1 is a diagram showing a system for transmitting a beam in the air according to the first embodiment. On the transmitting side, there are provided a wavelength variable semiconductor laser 10 which is capable of generating a coherent beam of a reference wavelength $\lambda_0$ and a coherent beam of a wavelength $\lambda_1(\lambda_0 \neq \lambda_1)$ in a digitally switching manner, a control circuit 11 for controlling the light output power and the wavelength of the semiconductor laser 10, and a laser beam emitting window 12. The wavelength of the signal beam is required so that the beam is invisible when transmitted in the air. Preferably, the signal beam should be infrared light (760 nm or more wavelength). Herein, since a Si based device (having an acceptance sensitivity only if the wavelength of the beam is 900 nm or lower) is used as a light detection element, the used laser is an AlGaAs system semiconductor laser having a set wavelength of 830 nm.

On the receiving side, there are provided a polarizing filter 13 for converting a signal beam into a linear polarized beam, a filter 14 for cutting off almost all background light such as room illumination or skylight, and passing only the light having the wavelength for the signal beam (herein, 830 nm), a lens 15 for condensing the transmitted signal beam, a local oscillating semiconductor laser 16 for emitting a coherent beam having a reference wavelength (locally oscillated beam), a light detection element 17 for mixing the condensed signal beam with the locally oscillated beam and detecting a beat signal of both as a voltage or current, and a signal processing circuit 18 for amplifying and shaping an output of the light detection element 17 and demodulating the signal.

Figure 2A:
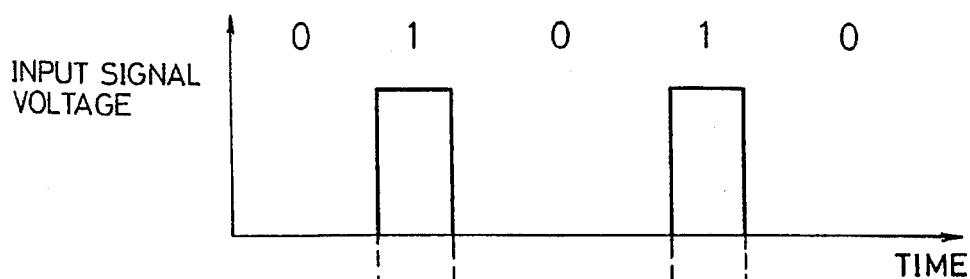
FIGS. 2A–2D are graphs showing a signal waveform at each stage in the system for transmitting a beam in the air according to the first embodiment.
Figure 2B:
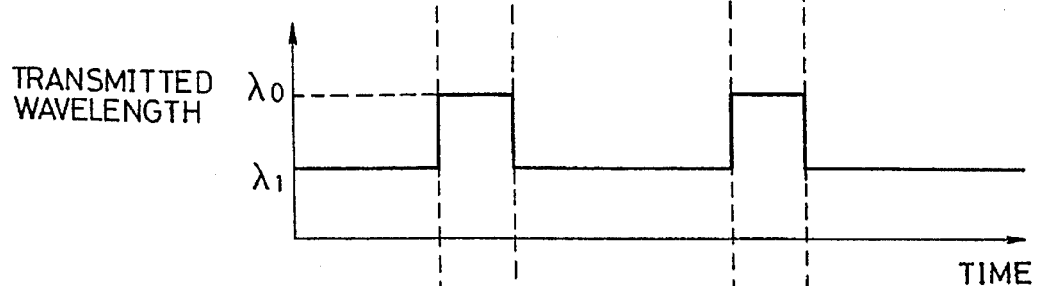

The principle of operation will be described below. Assuming that the digital signal to be transmitted is a signal (0, 1, 0, 1, 0) as shown in FIG. 2A, on the transmitting side, 0 and 1 of the digital signal is modulated to correspond to two wavelengths $\lambda_0$ and $\lambda_1(\lambda_0 \neq \lambda_1)$, and the oscillating wavelength of the wavelength variable laser 10 is modulated into the wavelength as shown in FIG. 2B by means of the control circuit 11. Then, the laser 10 serves to emit the beam in the air (Shift keying of light frequency (Optical FSK)).

It is important to a system for transmitting a beam in the air for civilian use that it avoid an adverse effect of the laser beam on a human body, especially the eyes. The greatest attention should be paid to the safety of the system in regards to human eyes. As for safety criteria about emission of a laser beam in the air, refer to JIS C 6802 (revised on May 1, 1991) published by the Japanese Standards Society.

In the arrangement according to the invention, when the signal beam emitted in the air reaches human eyes, the signal beam keeps the obsewatory state (the light having an ordered wave surface reaches human eyes). Hence, the safety criteria is the table 1 indicated in page 3 of the JIS document. Referring to this table, the maximum allowable exposure (MPE 1/10 of such a light density that the probability of being harmful to eyes is half) is regulated as shown below, depending on the wavelength of the used signal beam.

(1) 0.7 μm≦λ<1.05 μm

MPE=3.2×10$^8$ Wm$^{-2}$, in which k=(λ−0.7)/0.5

(For example, for λ=0.83 μm, MPS=5.8 Wm$^{-2}$)

(2) 1.05 μm≦λ<1.4 μm

MPE=16 Wm$^{-2}$ (3) 1.4 μm≦λ<10$^6$ μm

MPE=1000 Wm$^{-2}$

In this embodiment (λ=830 μm), the value corrected on a beam divergent angle is applied to the condition (1). Hence, a semi-spherical light emitting window 12 having a radius of 40 mm is provided in the transmitting device so that the light density immediately after the beam is emitted in the air is suppressed to be 2 Wm$^{-2}$ or less.

Figure 2C:
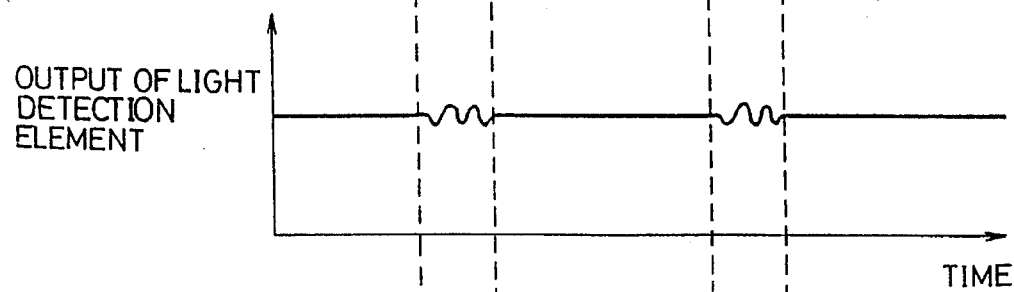

The beam is propagated in the air as the wavelength (frequency) is shifted as described above and reaches the receiving side. In the receiving side, the received beam is mixed with the reference beam (wavelength $\lambda_0$) and the mixed beam is converted into an electric signal through the effect of the light detection element 17 (FIG. 2C). At this time, to prevent noise components on the signal beam which noise has a polarizing direction orthogonal to the locally oscillated beam the polarizing filter 13 passes only the signal beam and eliminates noise by keeping the polarizing direction of the passed signal equal to that of the beam emitted from the local oscillating laser 16.

Herein, these two beams keeping their polarizing directions equal to each other are represented as follows.

$$\text{Signal Beam:} E_s = a_s \cos\{2\pi(v_0 + \Delta v)t + \phi_s\} \quad (1)$$

$$\text{Locally Oscillated Beam:} E_1 = a_1 \cos\{2\pi v_0 t + \phi_1\} \quad (2)$$

wherein $v_0 = C/\lambda$, $v_0 + \Delta v = C/\lambda_1$ and C denotes a light speed.

The light detection element 17 serves to mix these two beams with each other and perform square-law detection with respect to the mixed beam. The light detection element 17 outputs light current I which is represented as follows.

$$\overline{I = (E_s + E_1)^2} = \frac{1}{2} \cdot \{a_s + a1^2 + 2a_s a_1 \cos(2\pi \Delta v t + (\phi_s - \phi_1))\} \quad (3)$$

Figure 2D:
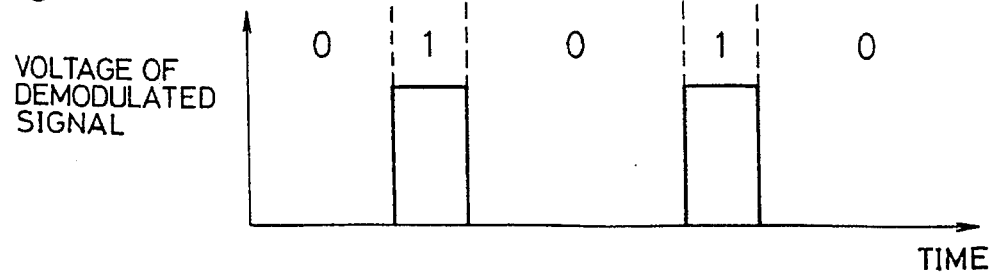

By taking a time average, the components of 2 $v_s$, $2(v_s + \Delta v)$, and 2 $v_s + \Delta v$ are eliminated. As is understood from the expression (3), when the signal beam has the same light frequency as the reference beam, ($\Delta v = 0$), the components of light current are d.c. only. When the signal beam has a different light frequency from the reference beam ($\Delta v \neq 0$), a beat signal (frequency $\Delta v$) corresponding to the difference between the light frequencies appears. The light detection element 17 needs to have a faster response speed than the beat signal frequency $\Delta v$. In this embodiment, $\Delta v = 1$ GHz is defined. This beat signal output isprocessed to be 1 only if the beat signal appears and 0 only if it does not appear. As a result, the transmitted light signal consisting of $\lambda_0$, $\lambda_1$ $\lambda_0$, $\lambda_1$, $\lambda_0$ is allowed to be processed as 0, 1, 0, 1, 0 (FIG. 2D).

This detecting system having the local oscillating laser 16 can be considered to apply to a trunk system fiber communication in future and is referred to as a coherent detecting system. The advantage of this detecting system is that if the power of the signal beam is weak ($a_s^2$ is small), the beat signal power to be detected takes a multiplied form of the electric fields of the signal beam and the locally oscillated beam ($a_s$ $a_1$). Hence, the coherent detecting system is less susceptible to noise than is the traditional direct detecting system. A system for transmitting a beam in the air (in which as the signal beam is made more divergent when it is transmitted in the air, and the power density of the signal beam is made smaller) is one of the applications making good use of this coherent detecting system.

In this embodiment, the minimum receiving sensitivity is about 10$^2$ photons. This value is an improved one by two to three digits as compared to the minimum receiving sensitivity 10$^4$ to 10$^5$ in the conventional IM modulation—direct detecting system air transmission. In actuality, the system according to this embodiment enables transmission of a digital signal at a speed of 40Mbps. This value represents a sufficient transmitting capacity for transmitting moving image data.

This invention is relatively immune to the noise components caused by the background light. This is because the coherent detecting system operates to convert only the coherent beam having a wavelength very close to the wavelength of the locally oscillated beam into the beat signal. (In this embodiment, the wavelength selecting filter is used for preventing the output of the light element from being saturated by strong background light.) The signal bean condensing lens 15 may use a hologram lens. The hologram lens does not condense the incoherent background light, but does condense the coherent signal beam.

As described above, theoretically, the present invention makes it possible to stably transmit the information such as digital moving image data required to be transmitted at fast speed through the beam being emitted in the air.

However, to absolutely stabilize the wavelength of the reference beam in the transmitting side and the receiving side, a complicated device arrangement (a system arranged to have an additional circuit for locking an oscillating wavelength to an absorption line of a specific gas or a system arranged to have a wavelength-selective light element such as an etalon or a grating, for example) is required. This is unfavorable. In this embodiment, the local oscillating laser 16 in the receiving side is a wavelength variable type and employs "an occasional tuning detecting system". This occasional tuning detection system transmits a reference beam from the transmitting side at any proper time when a transmission or reception is started or being executed, and tunes the reference beam with the reference beam ($\lambda_0$) in the receiving side. The reference beam to be transmitted is mixed with the beam emitted from the local oscillating laser 16 and the square-law detection is performed with respect to the mixed beam. The wavelength of the local oscillating laser beam is scanned to allow the beat signal to appear at the output of the light detection element 17 and then the proper wavelength is locked. With such a detecting system, the coherent detecting system for transmitting a beam in the air is made simpler and less expensive.

Figure 3:
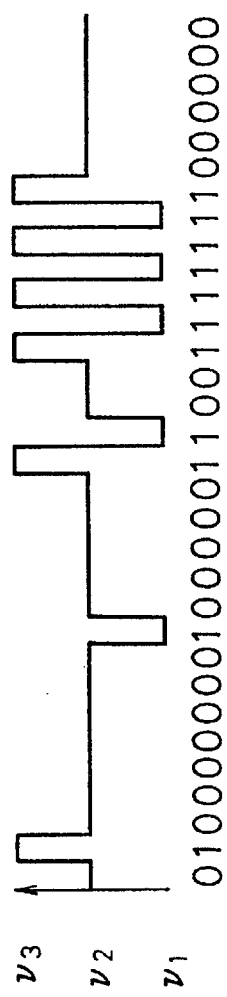
FIG. 3 is a graph showing an example of signal modulation done in the AMI (Alternate Mark Inversion) system.
Figure 4:
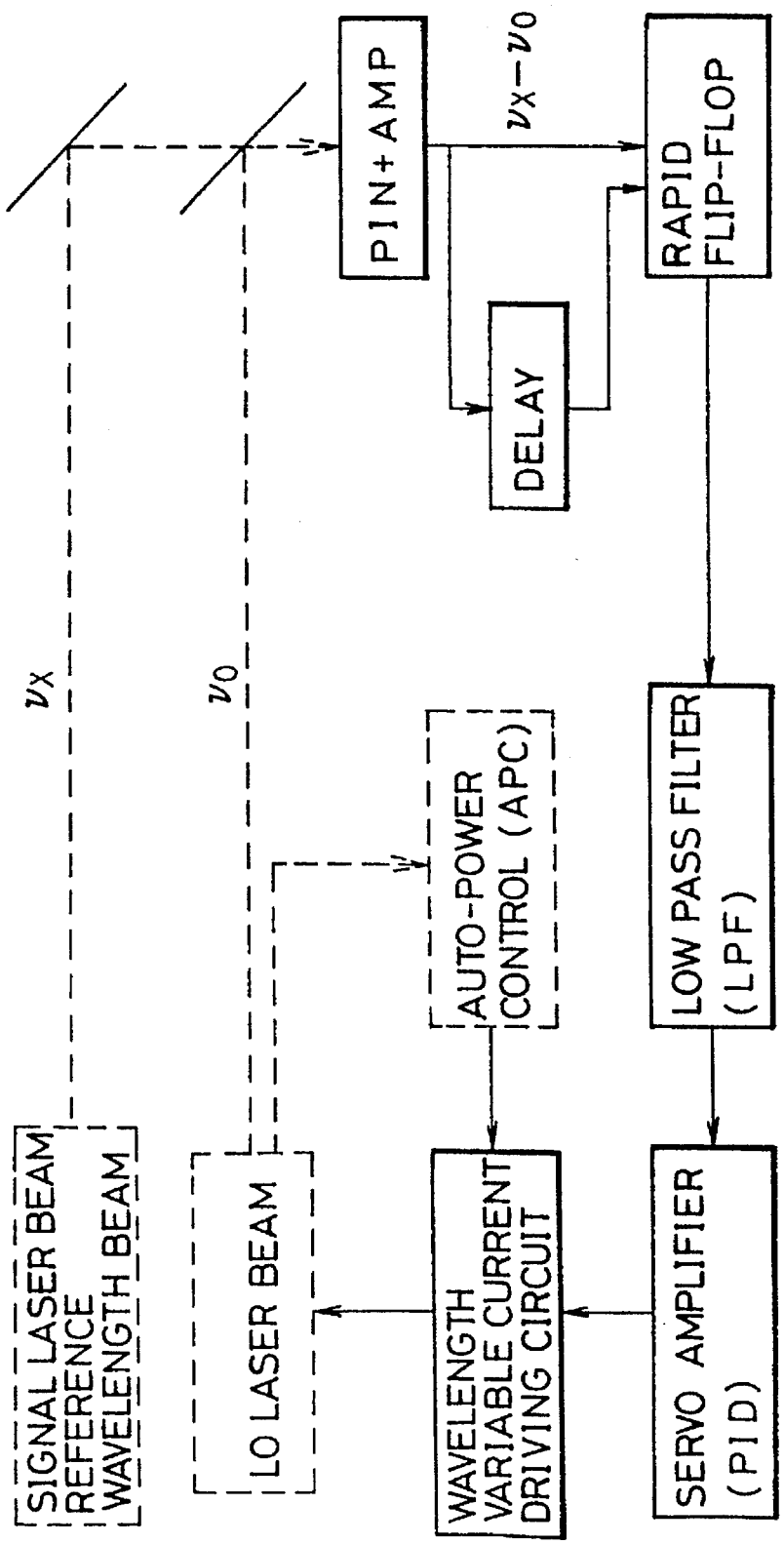
FIG. 4 is a block diagram showing an arrangement of a signal demodulating circuit for a beat signal.

To stabilize the wavelength of the local oscillating laser 16 in the receiving side, it is possible to employ "the reference beam sensing type detecting system" which is different from "the occasional tuning detecting system". In this case, the similar transmission of a beam in the air is made possible. The used system is an AMI (Alternate Mark Inversion) system arranged so that if any digital signal (0 and 1 train) comes as the beam FSK signal, a time average of the transmitted light wavelength is defined as a constant value (see FIG. 3, for example). In this case, $(v_1+v_3)/2=v_2$ is defined. The arrangement of a signal demodulating circuit for a beam signal in the receiving side is as shown in FIG. 4. By passing the delayed-detected signal through a low-pass transmission filter, it is possible to output a voltage corresponding to a time-averaged light frequency (a value being substantially equal to $v_2$ as in the case shown in FIG. 3). Hence, by controlling the wavelength of the wavelength variable type local oscillating laser to keep this voltage as a constant value, it is possible to relatively stabilize the transmitted beam and the local oscillated beam at any time. Herein, the light frequency $v_0$ of the local oscillating laser is controlled to keep a constant frequency difference from the average $v_2$ of the signal beam frequency ($v_0-v_2$= constant).

Figure 5:
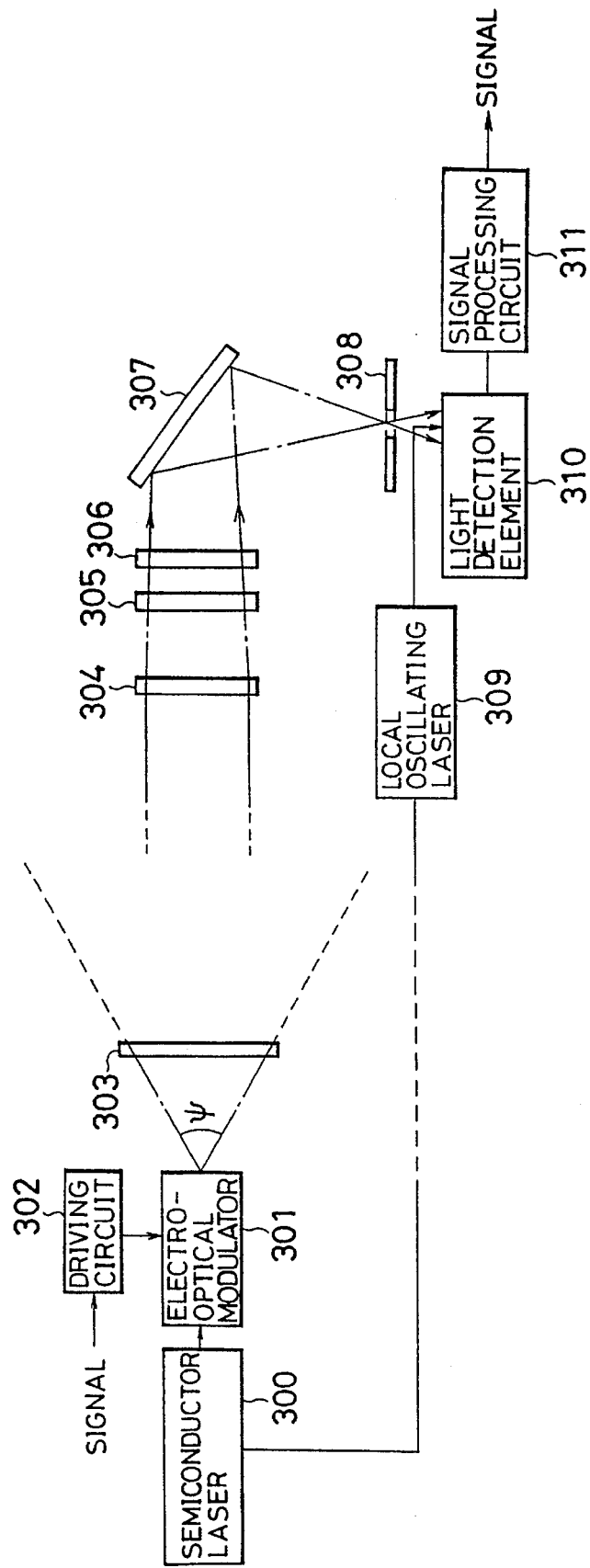
FIG. 5 is a diagram showing a system for transmitting a beam in the air according to a second embodiment of the present invention.

Next, the description will be oriented to a second embodiment of the invention in which light phase modulation is used as the signal modulating system. FIG. 5 is a diagram showing the system. In the transmitting side, a coherent beam is a reference beam (wavelength is 1.3 μm) generated in a semiconductor laser 300 and enters an electrooptical modulator 301 in which the phase of the beam is modulated through the effect of a voltage pulse generated in a driving circuit 302 according to the beam signal. (Herein, the used light source is a wavelength stabilizing laser made of an InGaAsP system semiconductor material.) The laser beam having the information overlapped on the light phase is emitted in the air and transmitted. A solid angle at which a laser beam is emitted from the transmitting device is set as 120° and a beam-emitting window 303 of the transmitting device is formed of a disk plate with a diameter of about 60 mm. With this adjustment, the density of the light power immediately after emitting the beam (at a place where the largest light power appears) is controlled as 2 W.m$^{-2}$. This value is far smaller than the safety criterion, 16 W.m$^{-2}$ (foregoing condition (2)).

In the receiving side for receiving the signal beam emitted in the air, a hologram lens 304 is used for condensing the signal beam coming from the transmitting side in the air. The hologram lens 304 operates to condense only the coherent light. (Through the hologram lens 304, the incoherent light such as skylight and room illumination is scattered.) By realizing the condensing function with the hologram 304, it is possible to selectively condense the coherent beam on which the signal is overlapped. In succession, the signal beam is converted into a circularly polarized beam through the effect of a $\lambda/4$ 305. Then, a light polarizing plate 306 selectively passes the linearly polarized components keeping their direction of polarization equal to that of a locally oscillated beam mixed when receiving the beam. The linearly polarized signal beam is diffracted by a reflective grating 307 and only a specific wavelength (wavelength area of the signal beam) is extracted from a slit 308 located at a focal position of the hologram lens 304. With this extraction, of the incoherent light mingled into the signal beam as a result of being scattered by the hologram 304, the light having the different wavelength from the signal beam is cut off.

As described above, through the effect of the selective condensing function for the coherent beam provided in the hologram lens 304, the wavelength selecting function provided in the grating 307 and the space slit 308, it is possible to remove almost all of the background light that contributes to the noise in the signal beam. The signal beam from which the noise light is removed is mixed with the reference beam emitted from the local oscillating laser 309 and the mixed beam enters into the light detection element 310 (which uses a PIN photodiode made of a Ge semiconductor material). The light detection element 310 performs the square-law detection with respect to the mixed beam and feeds the output indicated in the expression (3). The electric output sent from the light detection element 310 is processed by a signal processing circuit 311 for reproducing the original information.

The foregoing first embodiment employs the "occasional tuning detecting system" which makes it possible to tune the reference wavelengths of the transmitting side and the receiving side at certain time intervals and perform the coherent detection in place of using the semiconductor laser having an absolutely stabilized wavelength. On the other hand, the present embodiment selects "a self-interference type detecting system" which is arranged so that the receiving side may emit the reference beam in the air, the transmitting side may generate the beam tuned with the reference beam, modulate the tuned beam and send it back for implementing the homodyne detection. In particular, for the phase modulation, an external modulator 301 enables fast modulation. Hence, the self-interference type detecting system is favorably applied to the phase modulation. That is, according to the second embodiment, the reference beam generated by the semiconductor laser 300 provided in the transmitting side is tuned with the beam emitted from the local oscillating laser 309 provided in the receiving side. As a method for extracting the beam coming from the local oscillating laser and generating the beam tuned with the extracted beam, with the same method as the receiving side of this embodiment, the background light is removed (not shown) from the beam coming from the local oscillating laser and the extracted beam comes into the semiconductor laser 300.

Figure 6A:
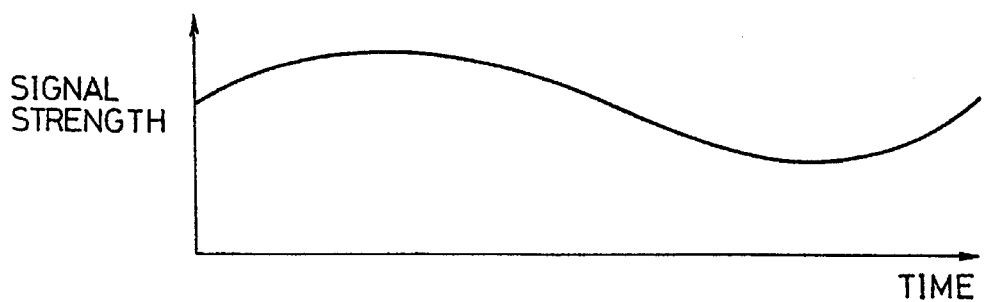
FIGS. 6A–6D are graphs showing a signal waveform at each stage in the system for transmitting a beam in the air according to the second embodiment.
Figure 6B:
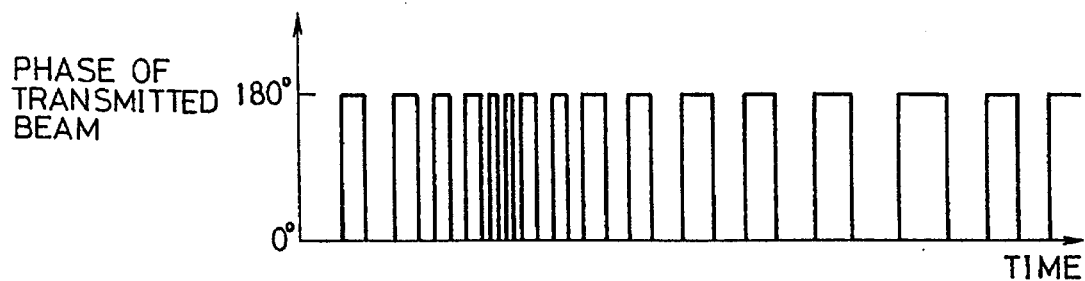
Figure 6C:
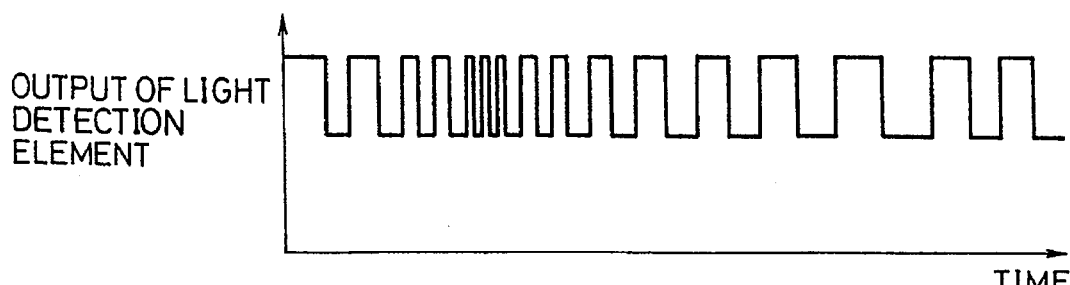
Figure 6D:
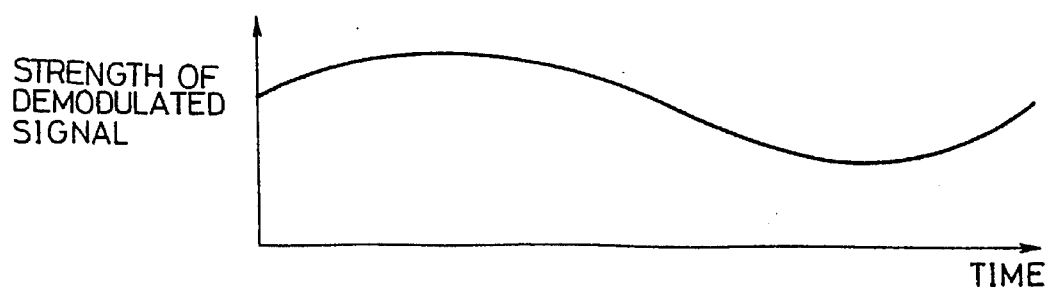

The description will be oriented to how the second embodiment operates when an analog signal is transmitted, for example. FIGS. 6A–6D show a signal waveform at each transmitting stage. FIG. 6A shows an analog voltage strength signal to be transmitted. This signal is electrically modulated into a pulsed frequency (FM). The pulsed frequency is light-phase modulated into a light signal as shown in FIG. 6B. The light signal is emitted in the air. In the receiving side, this signal beam is mixed with a local oscillating beam and the square-law detection is performed with respect to the mixed beam. Like the first embodiment, the resulting output is an electric output indicated in the expression (3). In the second embodiment, however, since the wavelength of the signal beam is not changed ($\Delta v=0$), the beat components indicated in the expression (3) do not appear. Hence, to obtain the pulse train, the strength modulation can be done by inverting a phase $\phi_s(t)-\phi_1$ according to the signal strength (FIG. 6C). From this pulse train, an original analog signal (FIG. 6D) is reproduced.

Also in the second embodiment, the amplitude of the signal component outputted from the light detection element is $a_s a_1$, that is, the amplitude of the signal beam amplified by the locally oscillated beam. Like the foregoing first embodiment, it is possible to make good use of the coherent detection (self-interference type detection in this embodiment) for making the high-speed transmission possible. In the case of the light-phase modulating system, the wavelength of the beam to be transmitted is constant. In the receiving side, hence, it is possible to select the "reference beam sensing type detecting system" which is arranged to read the wavelength ($\lambda_0$) of the reference beam from the signal beam and tune the read wavelength with the wavelength of a beam emitted from the local oscillating laser for detection. Also, it is possible to transmit optical information in the air at high speed and sensitivity.

In the second embodiment, the light phase modulation is performed by using the pulse train for the electric signal electrically frequency-modulated from an analog signal. In actuality, another signal modulating system used for general light transmission (for example, see the disclosure of page 241 in "Current State and Future of Optical Communication Technique" edited by Electric Communication Technique Council in 1987) may apply to the present invention. The most approximate signal modulating system should be selected according to the information to be transmitted.

As described above, the present invention makes it possible to propagate a coherent beam in the air and transmit a large volume of information such as a moving image by wireless. Next, the description will be oriented to each of the units used for composing a system for transmitting a beam in the air according to the invention.

Figure 7:
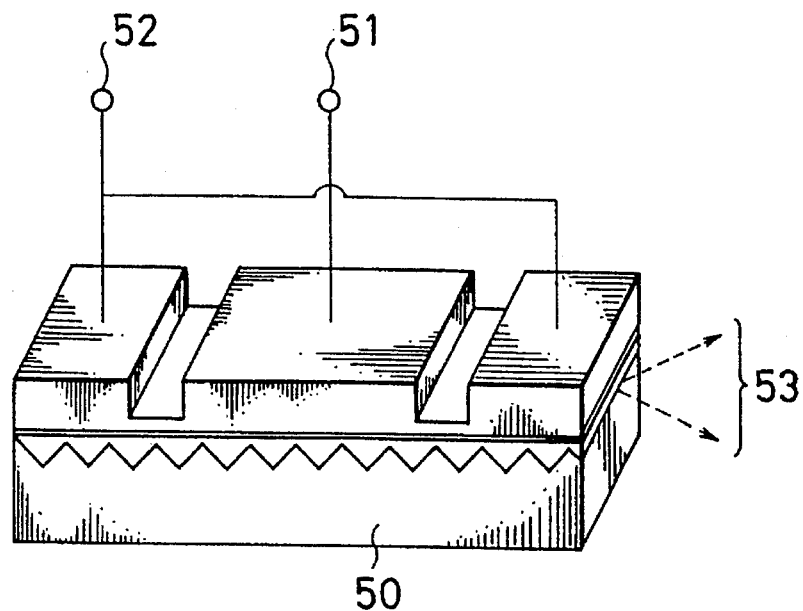
FIG. 7 is a view showing a transmitting unit which may apply to the system for transmitting a beam in the air according to the present invention.
Figure 8:
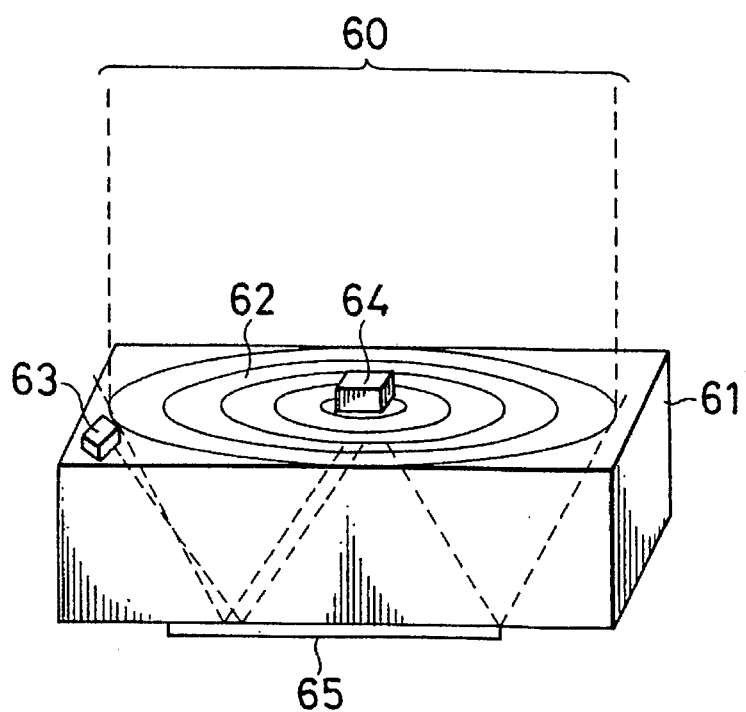
FIG. 8 is a view showing a receiving unit which may apply to the system for transmitting a beam in the air according to the present invention.

FIGS. 7 and 8 show a transmitting unit and a receiving unit to be applied to the foregoing embodiments. The integrated transmitting unit shown in FIG. 7 employs a distributed feedback structure. In this structure, the current injecting electrode of a semiconductor laser 50 having a stabilized wavelength is divided into two parts, each of which is connected to the current source. These two parts are a current injecting electrode 51 for oscillating a laser and a current injecting electrode 52 for controlling a wavelength of the laser. By changing the current to be injected to the wavelength control area 52, the wavelength is modulated so that a desired wavelength-modulated signal beam may be generated. The signal beam (coherent beam) 53 generated from this element is emitted and transmitted in the air. Also in this case, an emitting window (not shown) is provided for controlling a laser beam emitted in the air from the transmitting device to be a smaller power density than the foregoing safety criterion. To control a solid angle of emitting a beam, a normal optical system is used (not shown).

The structure shown in FIG. 7 is the simplest structure for obtaining a wavelength variable characteristic. The current injecting electrode may be divided into three parts, an additional one of which is a phase control area. This type of structure is applicable to the system according to the invention. To suppress noises caused by a return beam to the wavelength variable semiconductor laser element 50, it is possible to apply not the normal DFB structure, but a device in which the electrode of a gain coupling type DFB laser element (for example, Y. Nakano et al., Conference Digest, 12th IEEE International Semiconductor Laser Conference, E-7 pp. 72–73 or Japanese Patent Application Number 3-151546 invented by Kudou, et al.) is divided like the above structure. This device is very effective in reducing the noises of the transmitted beam.

FIG. 8 is a structure view showing an integrated receiving unit. To linearly polarize the signal beam 60, like the related art, the λ/4 plate and the polarizing plate (not shown) are provided for the unit. The receiving unit is arranged to have a color glass filter 61, a condensing hologram 62 formed on the surface of the color glass filter 61, a local oscillating laser 63 having a stabilized wavelength, a high-speed light detection element 64, and a reflective film 65 on the rear surface of the color glass filter 61. The color glass filter 61 serves as a substrate for the receiving unit as well.

Next, the description will be oriented to show how this receiving unit operates. The linearly-polarized coherent signal beam 60 is condensed on the receiving surface of the light detection element 64 through the effect of the phase hologram lens 62 formed on the surface of the color glass filter 61. Incoherent background light (noise components caused by skylight or room illumination) is not condensed by the hologram lens 62 so as to filter out noise and improve the S/N ratio when the signal beam is received by the detector 64. The color glass filter 61 absorbs visible rays and passes an infrared ray having the same wavelength range as the signal beam. The glass filter 61 eliminates almost all of the background light scattered by the hologram lens 62 and prevents the background light from being incident on the light detection element 64. The signal beam condensed by the hologram lens 62 is reflected on the reflective film 65 and is guided onto the receiving surface of the light detection element 64. The local oscillating laser 63 having a stabilized wavelength serves to generate a coherent beam having the same wavelength as the reference wavelength generated in the transmitting side by the method described with respect to the embodiment 1. The coherent beam is reflected on the reflective film 65 and is mingled into the signal beam 60. The mixed beam is incident to the light detection element 64.

This is the arrangement and the operating principle of the integrated transmitting/receiving units. The above-mentioned arrangement of these units makes it possible to reduce the rapid and highly sensitive unit for transmitting a beam in the air in size and realize the stable transmitting characteristic. The reduction of the system for transmitting a beam in the air in size and weight results in opening the way to wider application of the present system (for example, AV equipment or an image communication terminal).

Figure 9:
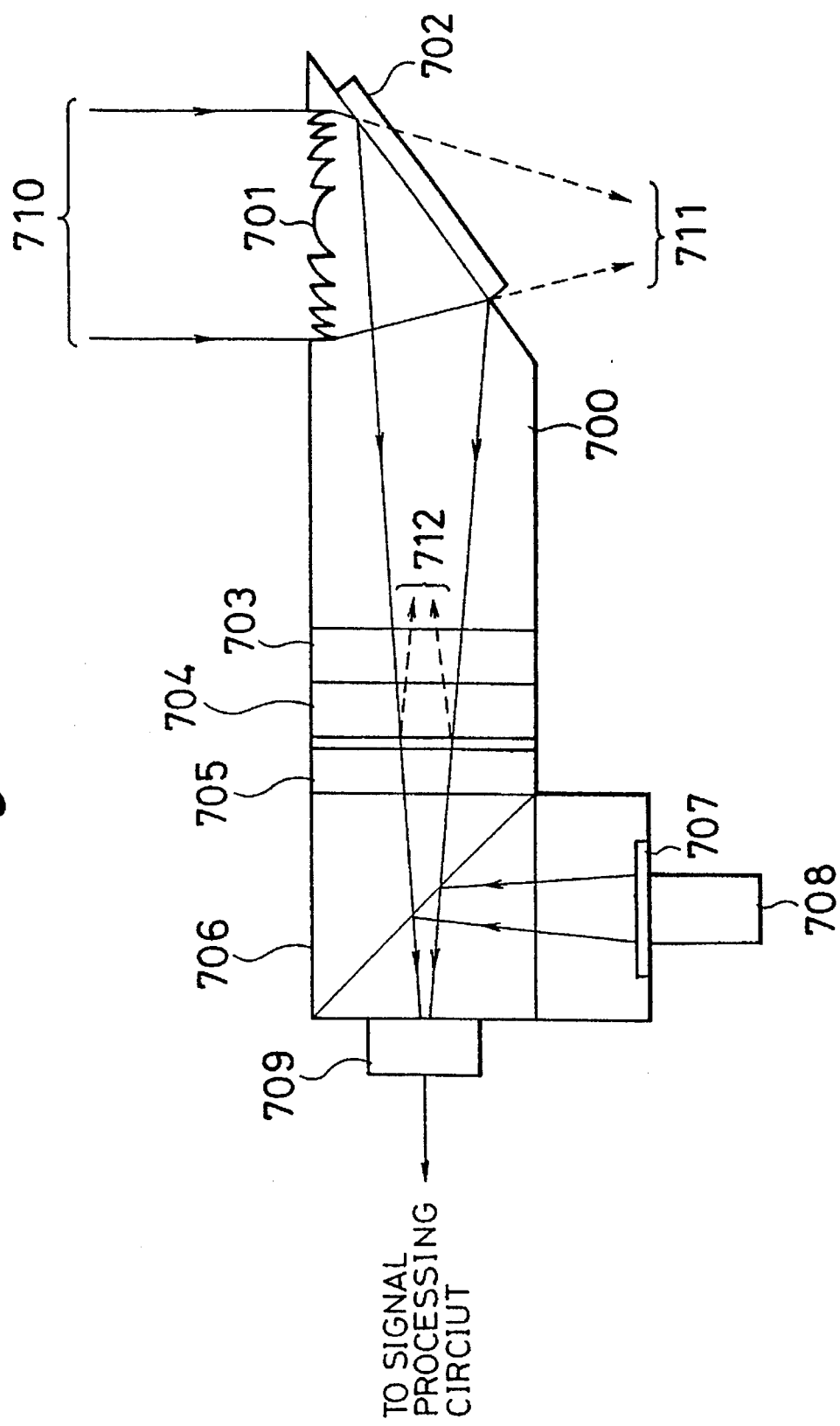
FIG. 9 is a diagram showing another receiving unit which may apply to the system for transmitting a beam in the air according to the present invention.

FIG. 9 shows an arrangement of another integrated receiving unit. This unit is composed by laminating together several optical small units (Fresnel lens 701 formed on a glass substrate 700, a polarizing hologram 702, a λ/4 plate 703, a polarizer 704, an optical band pass filter 705 formed on the surface of the glass plate, a beam splitter 706, a laser beam condensing hologram 707, a local oscillating semiconductor laser 708, and a rapid light detection element 709).

The description will be oriented to the operating principle of the integrated receiving unit arranged as above. Through the effect of the Fresnel lens 701, a transmitted beam 710 is converted into a converged beam along with the background light. Only the coherent signal beam is polarized into a desired direction through the use of the polarizing hologram 702. The incoherent background light 711 is scattered or transmitted out of the light receiving unit. The polarized signal beam is converted into a linear polarized component directed in the same direction as the local oscillating semiconductor laser 708 through the effect of the λ/4 plate 703 and the polarizer 704. Only the signal beam passes through the optical band pass filter for cutting off the noise component light 712 having a different wavelength from the signal beam. Through the effect of the beam splitter 706, the signal beam is mixed with a converged locally oscillated beam generated by the local transmitting semiconductor laser 708 and the condensing hologram 707. A square-law detection is performed with respect to the mixed beam by the rapid light detection element 709. The output current of the light detection element 709 is sent to a signal processing circuit composed of ICs for reproducing an information signal.

This integrated receiving unit makes it possible to transmit a beam in the air at high speed and high sensitivity and realize the reduction of the receiving device itself in size and weight by applying the coherent detecting system making good use of the feature of the laser beam like the foregoing receiving unit. In the plate-laminated type of optical integrated unit, a notch on the part of each component simplifies the positioning process of the optical elements when manufacturing the receiving unit, which leads to lowering the cost and stabilizing the characteristic of the unit.

In each of the foregoing embodiments, to match the signal beam to the locally oscillated beam in the polarizing direction, only the signal beam directed in a certain direction is used. However, from a viewpoint of demodulating a transmitted weak beam, it is preferable to effectively detect a coherent beam from the condensed signal beam. For that purpose, the signal beam and the locally oscillated beam is separated into the linearly polarized components in the two directions crossed at right angles. The light detection element serves to independently perform the square-law detection about each of those components. The electric outputs derived from these components are added to one output.

Figure 10:
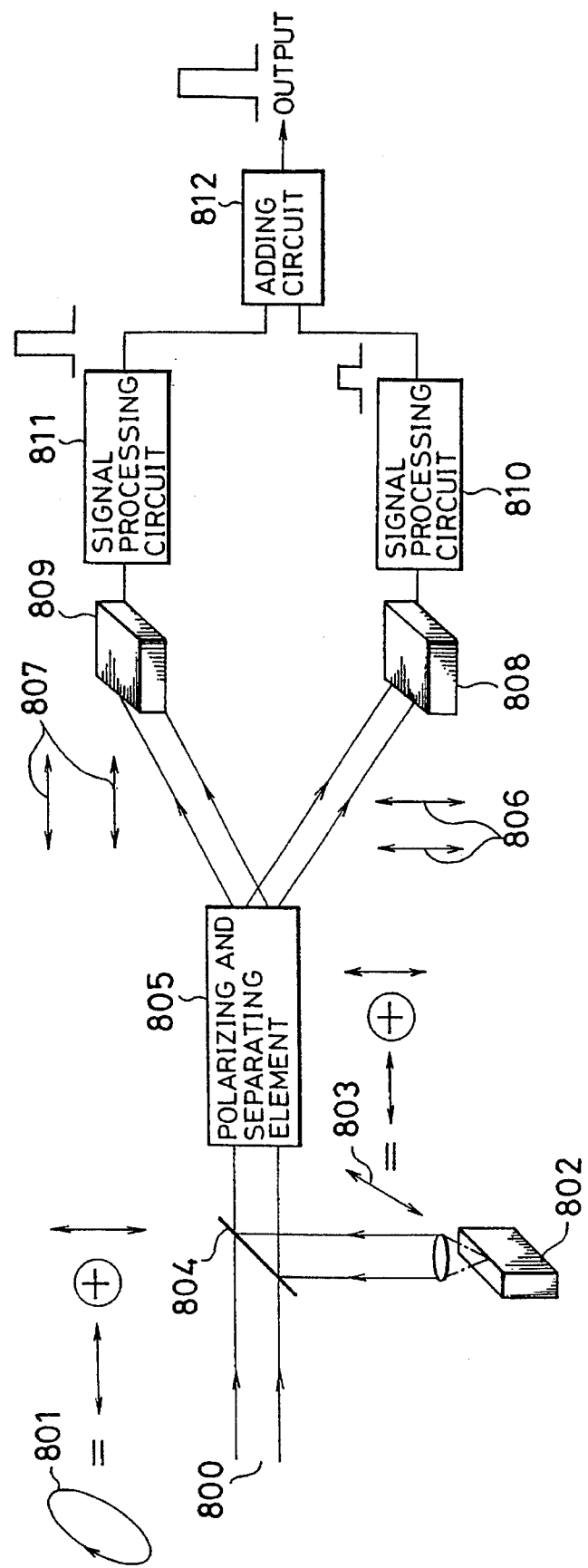
FIG. 10 is a diagram showing part of a receiving unit included in the system for transmitting a beam in the air according to a third embodiment of the present invention.

FIG. 10 shows an arrangement of a part of a receiving system employing a receiving system according to the third embodiment. In general, while a signal beam 800 extracted through the effect of the light-condensing function and the filtering function (located at the previous stage of the shown part, but is not shown for making the description simpler) is propagated in the air, the signal beam 800 is in an elliptically polarized state 801 since it is scattered and reflected. In other words, the signal beam is in a synthesized state of a vertically polarized component and a horizontally polarized component, both of which are shifted by phase with respect to each other. The elliptically polarized signal beam is mixed with the reference beam formed in the linearly polarized state 803 generated from the semiconductor laser 802 for locally oscillating a signal beam through the effect of a beam synthesizer 804, and the mixed beam is entered into a polarizing and separating element 805.

The polarizing and separating element 805 has a function of spatially separating the vertically polarized component from the horizontally polarized component. In this embodiment, the element 805 is located so that the vertically polarized component may be separated from the horizontally polarized component at an angle of about 45° against the polarization of the beam emitted from the local oscillating laser 802. In such an arrangement, the signal beam and the locally oscillated beam are mixed in light of each of the vertical and the horizontal components. The mixed beams for these two components are entered into the light detection elements 808 and 809, respectively, in which the square-law detection is performed about each of the mixed beams. The outputs from the light detection elements 808 and 809 are demodulated by the signal processing circuits 810 and 811, respectively. The demodulated outputs are added into one electric signal by an adding circuit. This process makes it possible to demodulate the elliptically polarized signal beam power.

With respect to the fourth embodiment of the invention, the transmitting device included in each of the aforementioned embodiments is required to suppress the light density immediately after the beam is emitted lower than the density indicated in the description about the first embodiment to emit the laser beam safely. To transmit a laser beam having a certain degree of power, the transmitting device needs to provide a large light emitting window that does not emit the laser beam in the air until the beam lowers down to the reference power density or less (see the first and the second embodiments). This makes the transmitting device large. (For example, the window has to be at least 36 mm in a diameter for transmitting a beam with λ=800 nm and an output of 20 mW.) To realize the high speed and the small size of the system, therefore, the laser beam has to be safe to human eyes though it keeps a certain degree of power density.

Referring to JIS C 6802 described in the first embodiment, it is to be understood that infrared rays or far infrared rays having a wavelength of 1.4 μm or more can be safe for human eyes, even if the beam output is as high as 2 or more digits as compared to the near infrared rays (0, 7 μm<1.4 μm). This results from the fact that an absorption coefficient α of the beam having a wavelength in the ranges against water is very large. In particular, in the wavelength range of 1.5 μm≦λ≦3 μmm (referred to as an eye-safe wavelength), this phenomenon is conspicuous (for example, λ=1.95 μm:α=1.1×10$^2$ cm−1, λ=2.95 μm:α=1.2×10$^4$cm$^{-1}$, for details, see R. C. Stoneman, et al. *Optics & Photonics News*, Vol. 1, P10 (1990)). In the case of using a beam having a wavelength of 3 μm or more, an unfavorable phenomenon takes place in light of the thermal stability of the luminous element and the light detection element. Considering this unfavorable phenomenon, it is determined that a preferable laser beam for the signal beam has a wavelength of 1.5 μm≦λ≦3 μm.

In the system for transmitting a beam in the air according to the fourth embodiment, therefore, by using the signal beam having an eye-safe wavelength, it is possible to emit and transmit the signal having a higher power than the near infrared rays by about 2 digits. This results in realizing the speed-up and the high sensitivity of the system for transmitting a beam in the air.

The system configuration of the system for transmitting a beam having an eye-safe wavelength in the air is the same as that of the aforementioned embodiment, except that the optical components are replaced with those being suitable to the beam having the eye-safe wavelength. In this embodiment, the luminous element uses an InGaAsP system wavelength variable semiconductor laser (oscillating wavelength:1.6 μm) formed on the InP substrate and the light detection element uses an InGaAs system PIN photodiode formed on the InP substrate. With this wavelength, the density of the laser beam is allowed to go up immediately after the beam is emitted from the transmitting device in the air. Hence, the laser beam of about 20 mW is allowed to be transmitted from the window in a diameter of 5 mm. (For safety, the laser beam is restricted to have an output of 0.1 mW for λ=800 nm or an output of 0.3 mW for λ=1.3 μm in the condition of the same sized window.) The present embodiment can realize transmission of a digital signal of about 1.4 Gbps without having to be harmful to human eyes.

As set forth above, the beam having the eye-safe wavelength makes it possible to realize more rapid and highly sensitive systems for transmitting a beam in the air than the near infrared rays. In this fourth embodiment, the luminous element and the light detection element are made of an InGaAsP system semiconductor material. The longest wavelength obtained from this material is 1.67 μm. As is understood from the above description about the absorption coefficient of light against water, as the wavelength becomes longer, the safety is higher. Hence, it is preferable to use a beam having a wavelength of 2 μm or more as the signal beam. As a light source, a solid laser (wavelength 2.02 μm) made of Tm:YAG or a semiconductor laser made of an InGaAsP system material may be used. As the light detection element for the light source, a photodiode composed of an InGaAsSb system material or a photoelectric element composed of HgCdTe is usable.

As set forth above, by using a beam having a wavelength of 1.5 μm≦λ≦3 μm as the signal beam, it is possible to enhance the output of the transmitted beam, thereby realizing the speed-up and the high sensitivity of the system for transmitting a beam in the air.

Next, the description will be oriented to a fifth embodiment of the invention. In the coherent detecting system for transmitting a beam in the air, to realize the receipt of the beam at higher sensitivity, it is preferable to emit the beam from the transmitting device in the air without disordering the phase of the signal beam. Hence, the later description will be oriented to the transmitting device for emitting the signal beam without disordering the phase of the beam.

The arrangement of the transmitting device is the same as that shown in FIG. 1. The oscillating wavelength (about 850 nm) of the GaAs/AlGaAs system wavelength variable semiconductor laser element 10 is modulated according to the transmitted signal beam. The semiconductor laser element 10 is adjusted so that the output laser may be propagated in the air as a vertically and horizontally isotropic divergent beam (spherical wave having a spherical equiphase wave surface) at a solid angle of φ=40°. As a method for controlling the solid angle φ, this embodiment employs a method for controlling it according to the form of the light waveguide of the semiconductor laser element 10. (It is well known that the thickness of an active layer of the semiconductor laser element 10 or the horizontal thickness of the light waveguide is adjusted for control).

Figure 15:
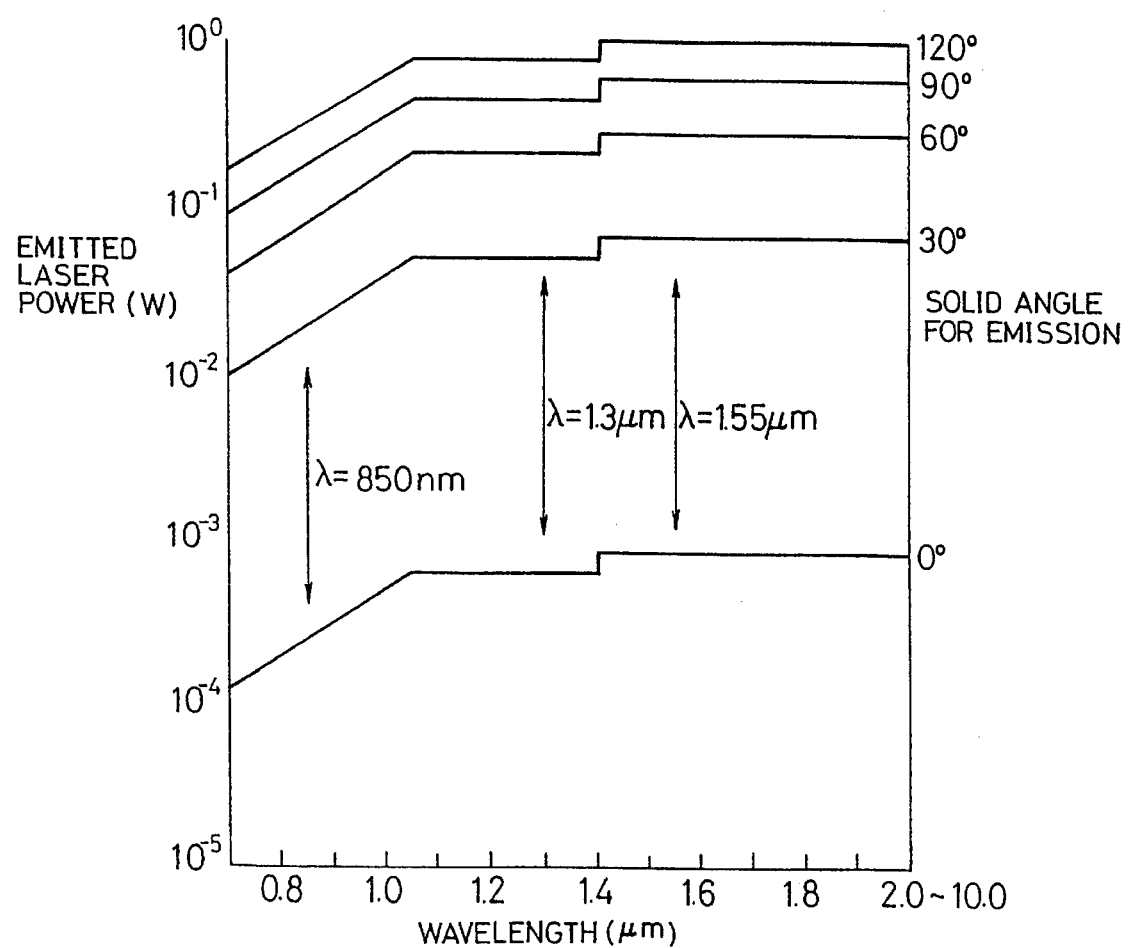
FIG. 15 is a graph showing how a power to be emitted in the air and a wavelength of the power depend on the solid angle for emission in the transmitting device according to a fifth embodiment of the present invention.

The emittable power (power giving no adverse effect on a human body) of the laser beam emitted in the air on such an emitting pattern is shown in FIG. 15 (according to the JIS standards). Normally, the maximum laser power of the wavelength variable semiconductor laser having wavelength of 850 nm is about 20 mW. Thus, it is understood from FIG. 15 that the emitting solid angle in this embodiment is required to be 30° or more. To implement the transmission of a beam in the air independently of where the receiving device is located, the larger solid angle is more preferable. As the solid angle becomes larger, however, the power density of the signal beam at the place of the receiving device is made smaller, thereby making the beam-transmittable distance shorter. According to the requirements (transmitting speed, transmitting distance, freedom of a receiving location, etc.) given by the system to which this invention applies, therefore, it is preferable to select the solid angle of the transmitted angle. With the spherical wave as the above-described signal beam, the equiphase wave surface of the beam is made spherical, and, thus, the signal beam received in the receiving device has a smooth phase surface. This results in being able to keep a high mixing efficiency of the locally oscillated beam and the signal beam when receiving the signal beam. Further, to enhance the mixing efficiency of the signal beam and the locally oscillated beam higher, it is preferable to provide a wave surface tuning function with the receiving device, the wave surface tuning function for controlling the traveling direction of the wave surface of the locally oscillated wave to match to the traveling direction of the wave surface of the signal beam.

Moreover, it is understood from FIG. 15 that by selecting a longer wavelength for the signal beam, the safety is improved and the emittable laser beam power is increased under the same emitting solid angle. (Conversely, for emitting the signal laser beam of about 20 mW, the minimum solid angle φ is made smaller as its wavelength becomes longer.) That is, if the laser beam of 20 mW having a longer wavelength than 1.3 μm is used as a signal beam, the minimum value of the solid angle φ is about 20°.

Figure 16:
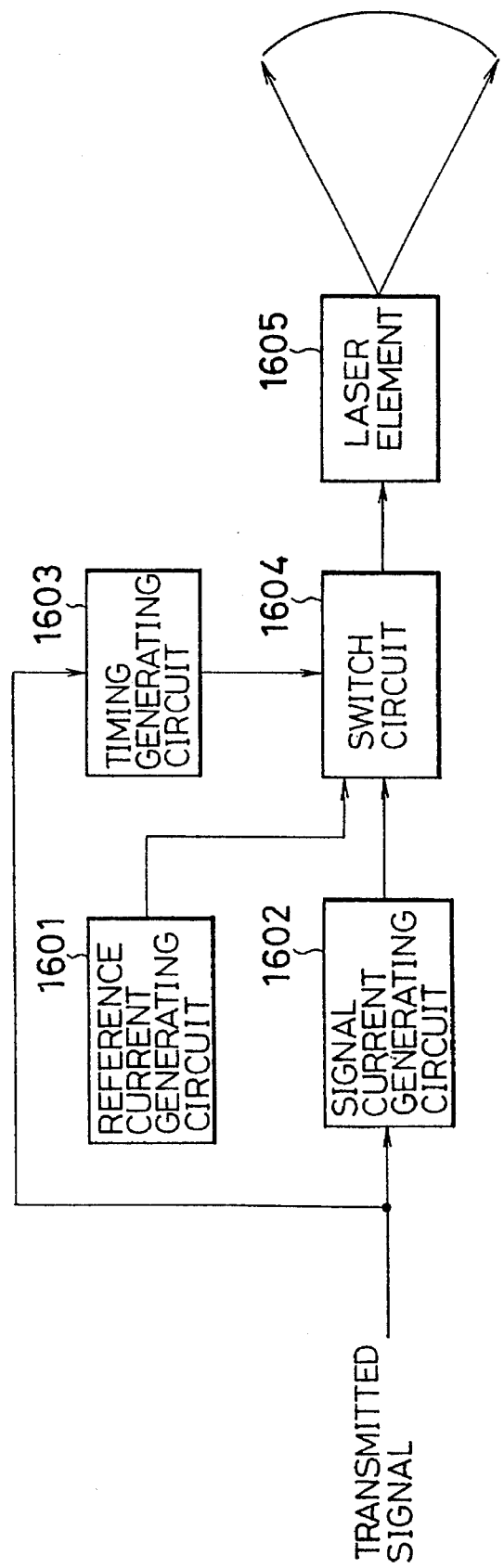
FIG. 16 is a block diagram showing a transmitting device according to a sixth embodiment of the present invention.

The relative wavelength (light frequency) tuning function, which is an important component of this invention, will be discussed in detail with respect to a sixth embodiment of the invention. FIG. 16 is a diagram showing the transmitting device. The transmitting device is arranged to have a reference current generating circuit 1601 for generating a constant reference current, a signal current generating circuit 1602 for generating a current modulated according to a digital signal to be transmitted, a timing generating circuit 1603 for setting a reference beam generating time, a switch circuit 1604 for switching a reference current to a signal current or vice versa according to the output of the timing generating circuit 1603, and a laser element 1605 for generating a laser beam having the oscillating light frequency modulated according to the output current of the switch circuit 1602 and emitting the laser beam in the air at a certain emitting solid angle.

Figure 18:
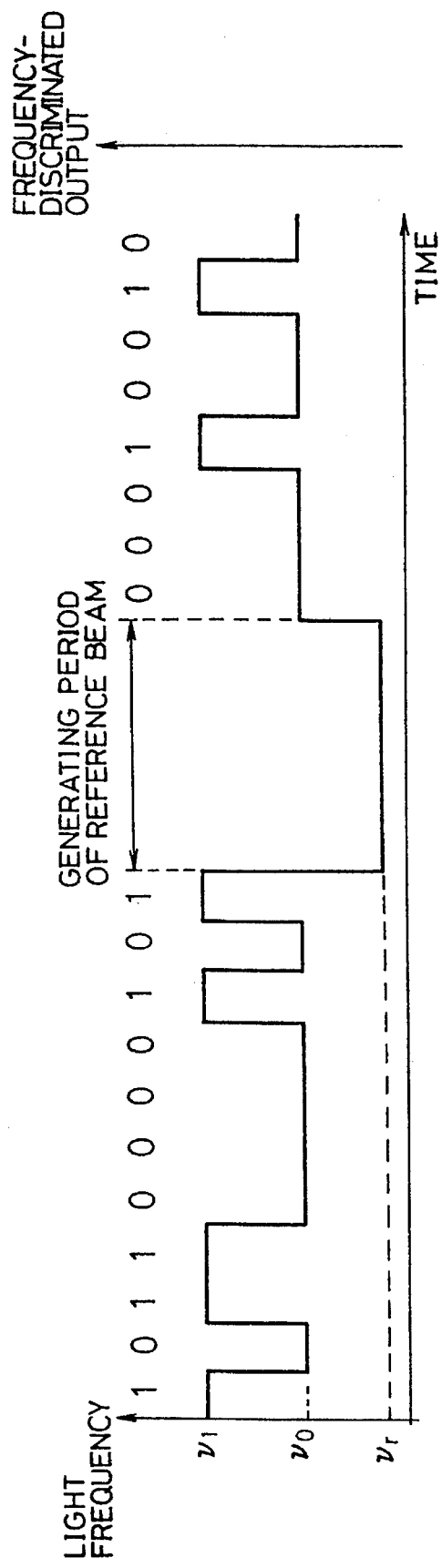
FIG. 18 is a graph showing change of a light frequency of a transmitted laser beam according to the sixth embodiment of the present invention.

The description will be oriented to the operating principle of the transmitting device included in this embodiment. The timing generating circuit 1603 serves to generate a reference beam generating timing (pulse) only during an interval of 0.5 μs every 128 bits of a transmitted signal. Through the effect of the switch circuit 1604, only when the pulse is active is the reference current switched from the reference current generating circuit 1601 to the laser element 1605. When the pulse is inactive, the signal current is switched from the signal current generating circuit 1602 to the laser element 1605. With the control done by the switch circuit 1604, as shown in FIG. 18, the laser element 1605 operates to generate a laser beam having a reference beam frequency $v_r$ only during an intermittent interval of 0.5 μs while the laser element 1605 generates a laser beam having two different light frequencies $v_0$ and $v_1$ corresponding to 0 and 1 signals. This reference light frequency $v_r$ can be selected independently of $v_0$ and $v_1$. It is, however, necessary to make the values of $|v_r-v_0|$ and $|v_r-v_1|$ smaller than the frequency discriminating range of the receiving device. This embodiment is arranged to set $|v_r-v_0|=1$ GHz and $|v_r-v_1|=2$ GHz. The shown condition of $v<v_0<v_1$ is not essential. For example, $v_0<v<v_1$ or $v_0<v_1<v_4$ meets the condition.

Figure 17:
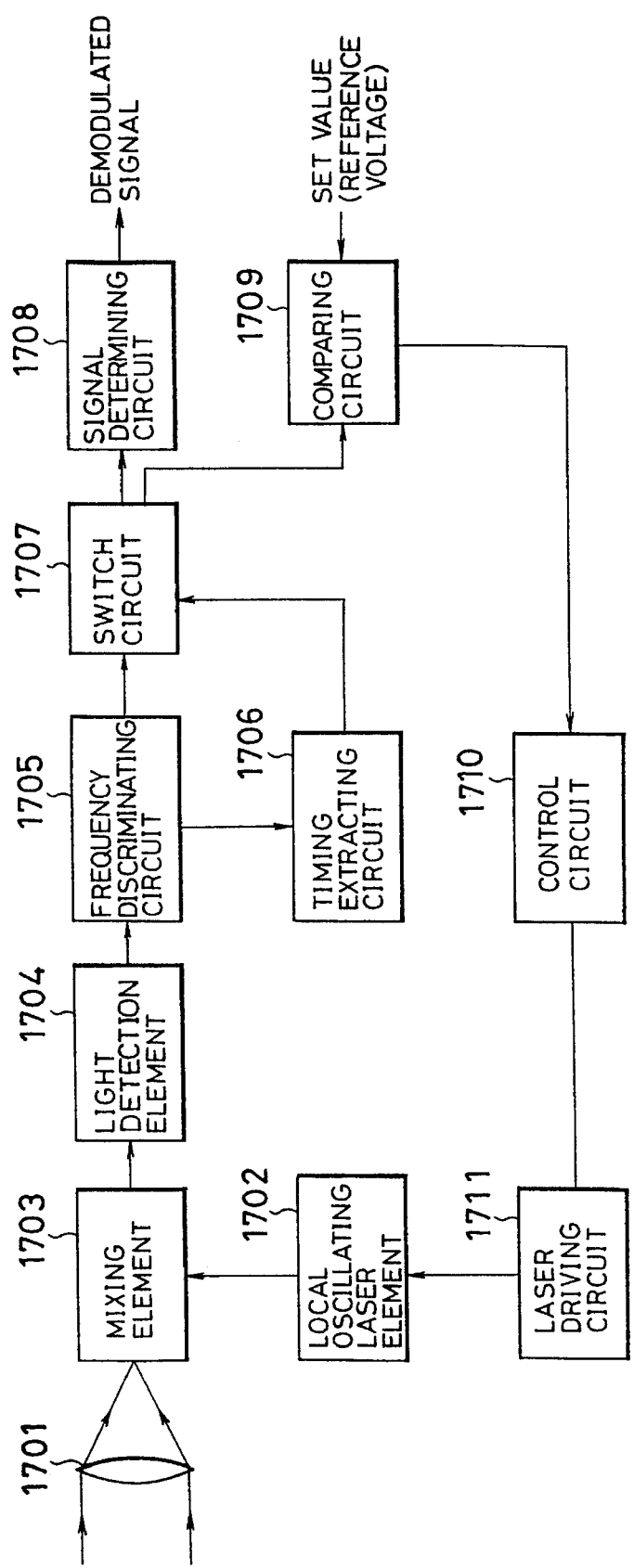
FIG. 17 is a block diagram showing a receiving device according to a sixth embodiment of the present invention.

FIG. 17 is a block diagram showing the receiving device. The receiving device is arranged to have a lens 1701 for condensing a signal beam coming from the transmitting device in the air, a local oscillating laser element 1702 for generating a locally oscillated laser beam, a mixing element 1703 for mixing the signal beam with the locally oscillated beam, a light detection element 1704 for photoelectric-converting the mixed beam into an electric signal, a frequency discriminating circuit 1705 for converting a frequency of the output signal sent from the light detection element 1704 into the corresponding voltage, a timing extracting circuit 1706 for extracting a reference beam generating timing set by the transmitting device (see FIG. 16) from the output of the frequency discriminating circuit 1705, a switch circuit 1707 for switching the flow of the output of the frequency discriminating circuit 1705 into a signal determining circuit 1708 or a comparing circuit 1709 according to the output of the timing extracting circuit 1706, the comparing circuit 1709 for comparing a frequency discriminating voltage of a beat signal generated on the light frequency of the reference beam with the predetermined voltage and generating a voltage proportional to voltage difference, a control circuit 1710 for adjusting a current value to be flown to the light frequency control electrode of the local oscillating laser element 1702 according to the output of the comparing circuit 1709, and a laser driving circuit 1711 for driving the local oscillating laser element 1702.

The receiving device operates to mix the transmitted signal beam containing the reference light frequency with the locally oscillated beam and receive the mixed beam. Hence, the receiving device detects the beat signal corresponding to the difference of light frequency between both of the beams. Since the locally oscillated laser beam is normally driven at constant current, in a short-term range, no change substantially takes place in the light frequency. As a result, the frequency of the beat signal changes like the light frequency shown in FIG. 18. The similar change (the ordinate axis in the right hand of FIG. 18) takes place in the output of the frequency discriminating circuit 1705. The timing extracting circuit 1706 operates to extract the reference beam generating interval from this signal. The output of this period is compared with the value (reference value) set from the outside by the comparing circuit 1709. The control circuit 1710 operates to adjust the current to be injected to the local oscillating laser element 1702 through the laser deriving circuit 1711 according to the output of the comparing circuit 1709. By occasionally tuning a difference between the reference light frequency of the signal beam and the light frequency of the local oscillating beam with the set value, the difference between the reference light frequency of the signal beam and the light frequency of the local oscillating beam is allowed to be constantly equal to the set value ("Occasional Tuning and Detecting System"). That is, the reference frequency of the signal beam is allowed to relatively match the light frequency of the locally oscillated beam.

As described above, by setting a signal period for tuning the light frequency, without implementing the AMI type coding as described in the embodiment 1, it is possible to keep a constant difference between the light frequency of the locally oscillated beam and the reference beam frequency of the signal beam. In the present system, a repetitive period of the reference beam generating interval is an important parameter. This is because it is necessary to repeat the light frequency tuning operation at the same period as a time constant of a disturbance in which the oscillating beam wavelength of the transmitting laser element 16 is relatively shifted with respect to that of the local oscillating laser element 1702 in the constant current driving condition. The period may be shorter than the time constant. In general, the change of the light frequency (wavelength) of the semiconductor laser element in the constant-current operation results from a minute change of a temperature inside of the element itself. Such a time constant on the change of the light frequency resulting from the heat is about 1 μs. Hence, the optimum repeating frequency of the reference beam generation is 1MHz to 2MHz. In this embodiment, 1MHz is selected.

Figure 19:
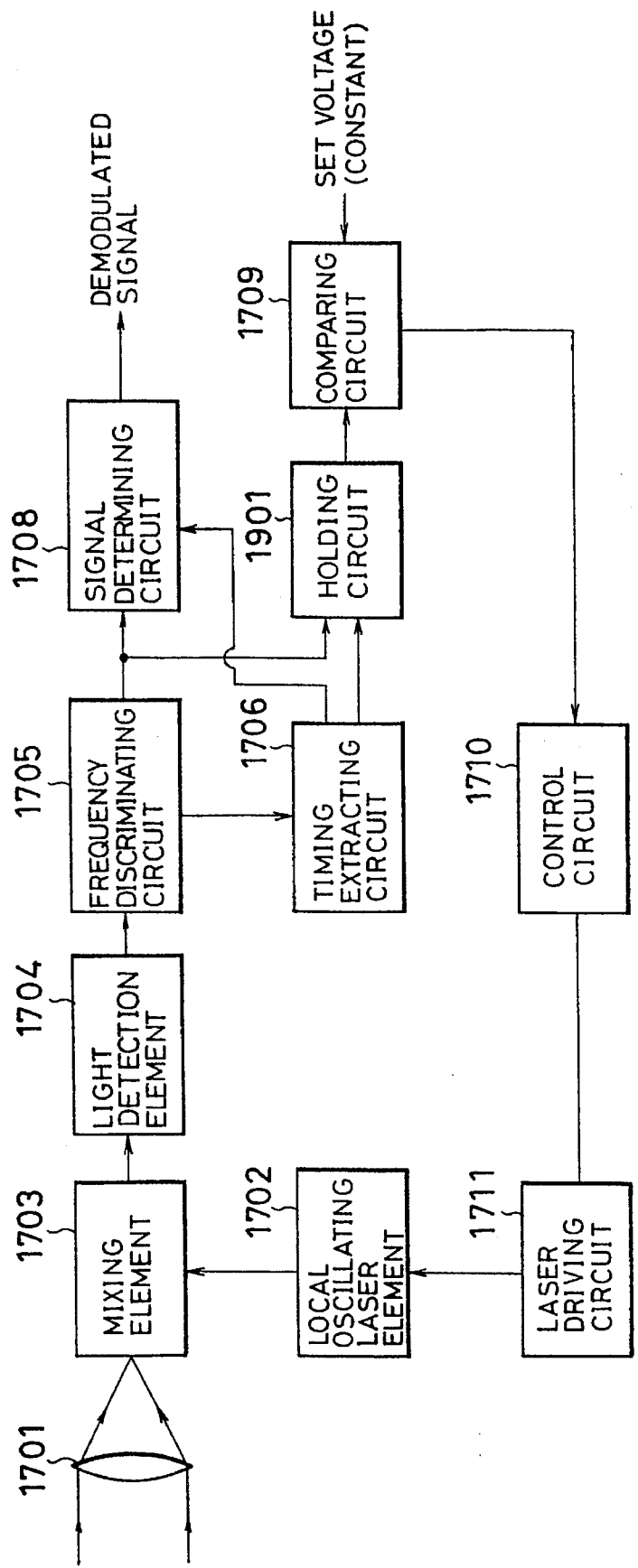
FIG. 19 is a block diagram showing a receiving device in a seventh embodiment of the present invention.

It is preferable to shorten the interval and delay the repetitive frequency as much as possible. FIG. 19 (in which the circuit having the same function as that shown in FIG. 7 has the same reference number) shows a seventh embodiment for shortening the reference beam generating period, and includes a holding circuit 1901 before the comparing circuit 1709. Further, based on the output of the timing extracting circuit 1706, the demodulating timing and the timing for holding a voltage value are set. This seventh embodiment makes it possible to reduce the reference beam emitting time to a total (about 30 ns) of the response time of the reference beam extracting circuit and the time for holding the voltage value, irrespective of the response times of the comparing circuit 1709 and the control circuit 1710.

In the "reference beam sensing type detecting system" described in embodiment one, since the average frequency of the beat signal is required to be constant, the AMI system (see FIG. 3) is employed as the signal modulating system. However, the AMI system needs to transmit a ternary digital signal. Hence, under the same S/N ratio, the ternary digital signal is inferior in a bit error rate to a binary digital signal. Another signal coding system (Manchester system, for example) may be employed. In this case, however, such a system needs to prepare twice or more as wide a transmission band as the signal band to be transmitted. In the case of transmitting the signal modulated by the normal binary light frequency shift keying (FSK), the circuit arrangement as shown in FIG. 4 causes change of a discriminated average light frequency to be detected according to a mark factor (appearance rate of 0 and 1) of the signal train to be transmitted. This results in disabling to keep a constant difference between the reference light frequency of the signal beam and the light frequency of the locally oscillated beam. An eighth embodiment is arranged to detect the mark factor in another manner and feed it back to the control circuit for tuning the reference light frequency of the signal beam with the light frequency of the locally oscillated beam.

Figure 20:
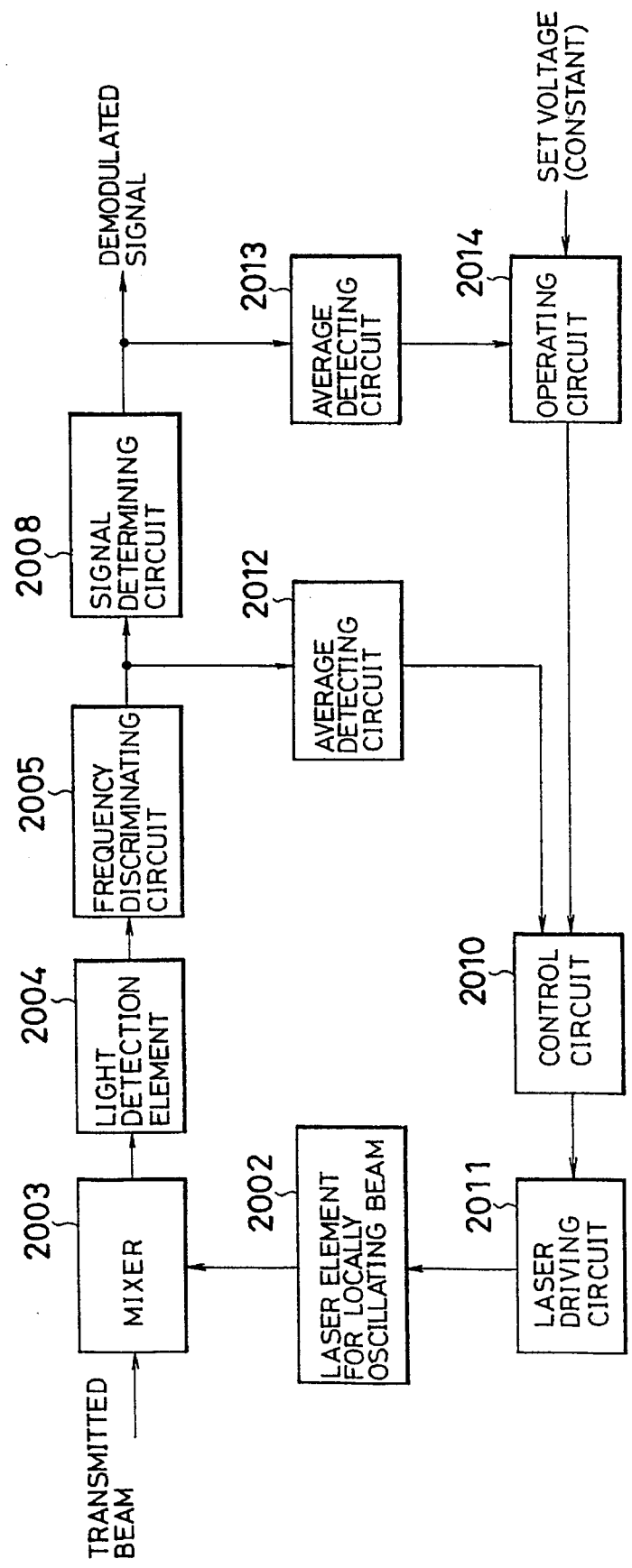
FIG. 20 is a block diagram showing a receiving device in an eighth embodiment of the present invention.

FIG. 20 is a block diagram showing a receiving device included in this eighth embodiment. This receiving device is arranged to have a laser element 2002 for generating a local oscillating beam, a mixer 2003 for mixing a signal beam with a locally oscillated beam, a light detection element 2004, a frequency discriminating circuit 2005, a signal determining circuit 2008, average detecting circuits 2012 and 2013, a control circuit 2010, a laser driving circuit 2011, and an operating circuit 2014.

In the receiving device, the transmitted beam is mixed with the locally oscillated beam in the mixer 2003. The mixed beam is converted into an electric signal in the light detection element 2004. From the output of the light detection element 2004, a beat signal corresponding to the difference between the light frequencies of the two beams is detected. The frequency discriminating circuit 2005 detects the frequency of this beat signal and output it as a voltage. The output voltage is compared with a threshold value in the signal determining circuit 2008 for determining if the output voltage is 0 or 1. Then, the determined signal train (demodulated signal) is output. On the other hand, the average detecting circuit (low pass filter: LPF) 2012 serves to take an average of the output of the frequency discriminating circuit 2005. The output of the signal determining circuit 2008 is sent to the average detecting circuit (LPF) 2013 in which an average (mark factor) of the signal voltage is taken. Next, the mark factor and a constant set voltage are applied to the operating circuit 2014, from which the set light frequency of the locally oscillated beam is outputted. In order to keep the difference between the set light frequency of the locally oscillated beam and the actually discriminated average frequency constant, the control circuit 2010 outputs a voltage to the laser driving circuit 2011 in a manner to adjust a current value to be injected to the local oscillating laser. With the adjustment, the wavelength (light frequency) of the locally oscillated beam is tuned with the reference light frequency of the transmitted beam.

According to the present system, the addition of a mark factor detecting circuit (the LPF 2013 and the operating circuit 2014) makes it possible to tune the reference light frequency of the transmitted beam with the light frequency of the locally oscillated laser beam without having to use a special coding system such as the AMI coding. That is, in the system shown in FIG. 20, the wavelength tuning function based on "the reference beam sensing type detecting system" can be implemented.

In the foregoing description, it is assumed that the light frequencies of both of the beams are synchronous to each other at an initial stage. In actuality, when initializing before starting the transmission, the transmitting device generates a light FSK signal corresponding to a signal train (for example, 00000 or 101010) having a predetermined mark factor and continues to scan the light frequency of the locally oscillated laser beam until the demodulated signal output (or discriminated frequency output) becomes a predetermined value. This operation can be realized by the circuit shown in FIG. 20 and the external control device (microcomputer or the like (not shown)).

Figure 11:
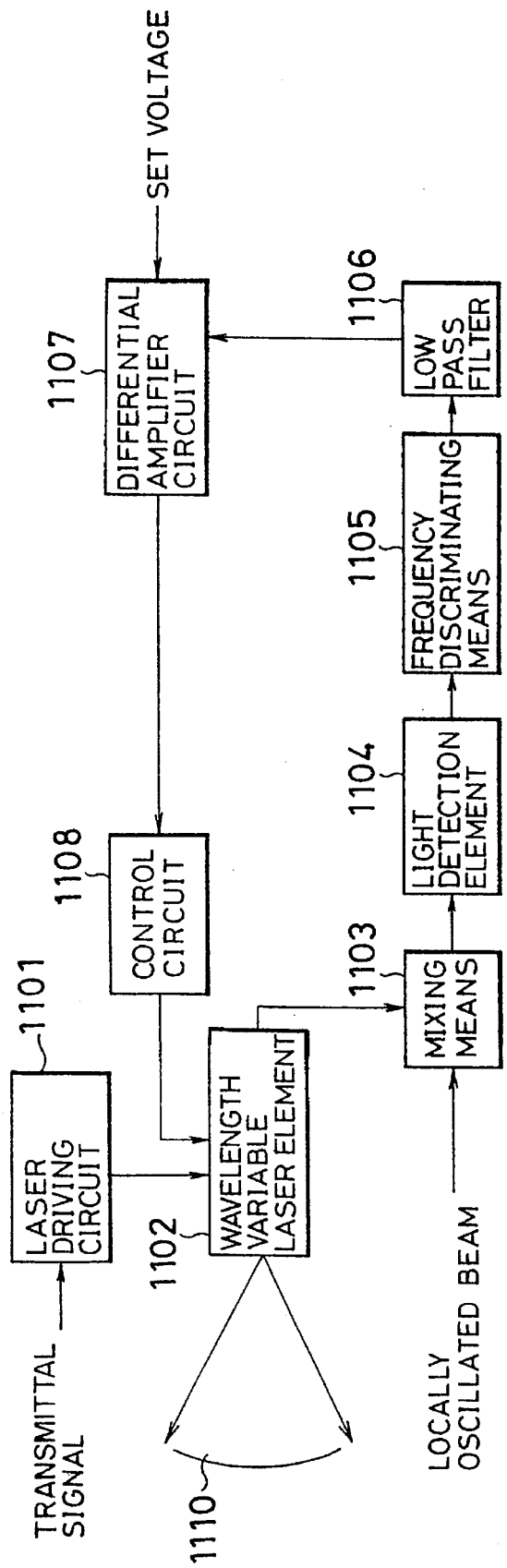
FIG. 11 is a block diagram showing a transmitting device according to a ninth embodiment of the present invention.
Figure 12:
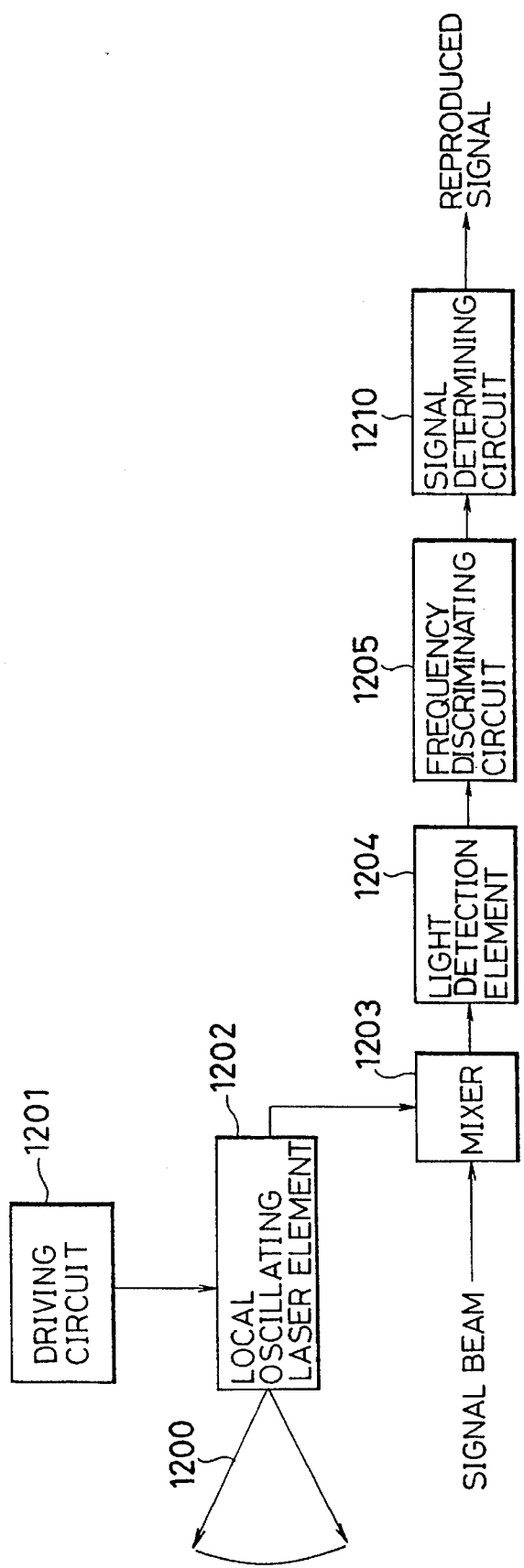
FIG. 12 is a block diagram showing a receiving device according to the ninth embodiment of the present invention.
Figure 13:
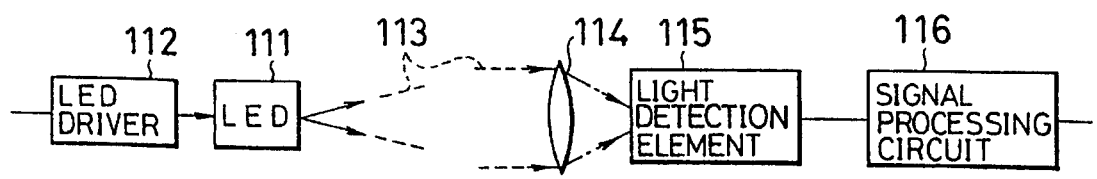
FIG. 13 is a diagram showing a conventional system for transmitting a beam in the air.
Figure 14:
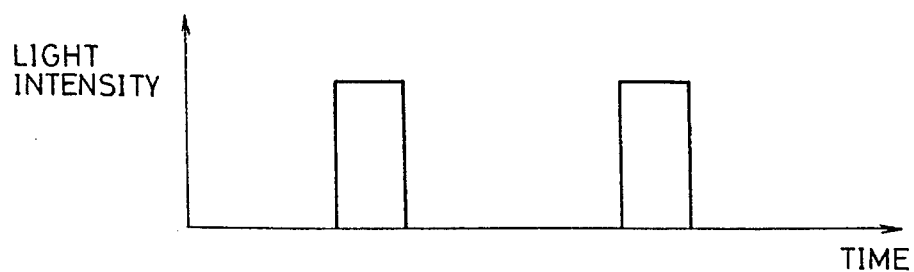
FIG. 14 is a graph showing a signal waveform of a transmitted beam in the conventional system.

In a ninth embodiment as shown in FIGS. 11 and 12, a system for tuning a wavelength of the locally oscillated beam with that of the signal beam ("the self-interference type detecting system", the summary of which has been described in the first embodiment) serves as a means for relatively tuning the wavelengths according to the present invention. FIG. 11 is a block diagram showing a transmitting device included in the system of this ninth embodiment. In this embodiment, on the side of the transmitting device, the reference wavelength of the signal beam is tuned with the wavelength of the locally oscillated beam emitted from the receiving device in the air. Part of the locally oscillated beam generated in the receiving device is emitted in the air. (The divergent beam is emitted in the range shown in FIG. 15 so that a human body may be protected from the laser beam.) On the other hand, the transmitting device operates to receive part of the locally oscillated beam coming from the receiving device in the air, mix it with the signal beam by a mixer 1103 such as a beam splitter or a waveguide type light wave mixing element, and photoelectric-convert the mixed beam into an electric signal by a light detection element $110^4$. Like the foregoing embodiments, the signal beam serves to activate a laser driving circuit 1101 to modulate a current value to be injected into the wavelength variable laser element 1102 according to the transmitted beam. The signal beam is divided into two, one of which is emitted as a divergent signal beam in the air 1110 and the other of which is mixed with the locally oscillated beam for detection in the transmitting device. As means for dividing the signal beam into two parts in this embodiment, the same two beams (forward firing beam and backward firing beams) emitted from the end of both resonators provided in the wavelength variable laser element 1102 are used. From the signal photoelectric-converted by the light detection element $110^4$ is detected the a.c. component corresponding to the light frequency difference (wavelength difference) between the locally oscillated beam and the signal beam. This a.c. component is converted into a voltage value through the effect of a frequency discriminating means $110^5$. The discriminated frequency output passes through the low-pass filter 1106 for detecting a signal corresponding to an average light frequency difference between the locally oscillated beam and the reference beam of the signal beam. This embodiment employs the foregoing AMI type signal modulating system for preventing the average light frequency difference from being changed depending on the mark factor. A differential amplifying circuit 1107 serves to generate a voltage corresponding to a difference between the average light frequency difference signal and the voltage value set from the outside. A control circuit 1108 serves to control a bias current to be injected to the wavelength variable laser element 1102 in a manner to keep the generated voltage constant.

The use of the transmitting device arranged as indicated above makes it possible to realize detection of a coherent beam without having to use a feedback control system for tuning the wavelengths in the receiving device. Hence, the receiving device does not need to provide the feedback control system as shown in FIG. 12. The operating principle of the receiving device will be discussed below in detail. The local oscillating laser element 1202 is driven at a constant condition by a driving circuit 1201 so that the laser element 1202 can generate the locally oscillated beam. This oscillated beam is divided into two parts, one of which is emitted as a divergent beam in the air and the other of which is mixed with the signal beam coming from the transmitting device in the air through the effect of the mixer 1203. The mixed beam is photoelectric-converted into an electric signal. The method for reproducing a signal from the photoelectric-converted output is the same as the foregoing embodiment. This method is implemented by a frequency discriminating circuit 1205 and a signal determining circuit (comparator) 1210.

Since the transmitting device and the receiving device are arranged as described above, the arrangement of the receiving device is made simpler and the relative wavelength tuning can be implemented. The simpler receiving device is effective in reducing the receiving device in size and lowering the power consumption of the receiving device, thereby making the receiving device a battery-driven handy terminal.

Further, with the similar self-interference type wavelength tuning system, the transmitting device and the receiving device are allowed to be similarly arranged (as shown in FIG. 11) and may be used for implementing the interactive transmission.

The present embodiment uses the AMI coding system as a system for detecting a light frequency difference between the signal reference beam and the locally oscillated beam in the transmitting device. In place, the arrangement for detecting the mark factor and comparing it with the set voltage as described in FIG. 20 or the occasional tuning system as described in FIGS. 16 and 17 may apply to the system for detecting a light frequency difference.

The foregoing description has been concerned with various disclosed embodiments. However, the present invention is not limited to the disclosed embodiments. For example, the following embodiments can be easily derived from the disclosed embodiments, and may offer similar effects.

(1) A different modulating system or coding system for a transmitted signal than the systems disclosed.

(2) A different concrete arrangement of the system (for example, see "O plus E" January, 1990, pp. 82 to 91).

(3) Each of the components of the system may be different from that of the disclosed embodiments (for example, see "O plus E", January 1990, P. 92 to 131 or Kikuchi, "Electric Communication Society Journal", August, 1986, pp. 816 to 823).

(4) The power of the transmitted beam is different from that indicated in the embodiment, unless the power has an adverse effect on a human body.

As described above, the system for transmitting a beam in the air according to the present invention provides a transmitting device having means for modulating a wavelength or a phase of a coherent beam according to a signal to be transmitted for generating a signal beam and means for forming the signal beam as a spherical divergent beam, and a receiving device having means for generating a coherent locally oscillated beam, photoelectric-converting means for mixing the signal beam with the locally oscillated beam and receiving the mixed beam, frequency discriminating means for detecting a light frequency difference between the signal beam and the locally oscillated beam from the output of the photoelectric-converting means and signal reproducing means for reproducing a signal from the output of the frequency discriminating means. Further, any one of the receiving device and the transmitting device has means for relatively tuning wavelengths, the means for controlling the wavelength of the locally oscillated beam or the reference wavelength of the signal beam in a manner to keep the difference between the reference wavelength of the signal beam and the wavelength of the locally oscillated beam as a predetermined value. Hence, the present invention provides a rapid and highly sensitive system for transmitting a beam containing information such as a moving image by wireless.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system for transmitting information by modulating a light frequency or a phase of a coherent beam to be propagated through free space, said system for transmitting information comprising:

a beam transmitter for transmitting a digital data signal, said transmitter including
a reference current generating circuit for generating a constant reference current,
a signal current generating circuit for generating a signal current modulated in accordance with a digital signal to be transmitted,
a timing generating circuit for generating a reference beam timing signal that is injected into each transmission of a predetermined number of bits of said digital data signal,
a first switch circuit for outputting said reference current or said signal current in accordance with said reference beam timing signal, and
a laser element for generating a laser beam having an oscillating light frequency modulated in accordance with an output current of said first switch circuit and emitting said laser beam in the air at a certain emitting solid angle; and said system for transmitting information further comprising:

a receiver receiving said laser beam transmitted in the air including
a lens for condensing said laser beam from said transmitter and generating a condensed signal beam,
a local oscillating laser element for generating a locally oscillated laser beam,
a mixing element for mixing said condensed signal beam with said locally oscillated laser beam to generate a mixed beam,
a light detection element for photoelectric-converting said mixed beam into an electric signal,
a frequency discriminating circuit for converting a frequency of an output signal from said light detection element into a corresponding voltage,
a timing extracting circuit for extracting said reference beam timing signal from said transmitter from an output of the frequency discriminating circuit,
a comparing circuit for comparing an output of said frequency discriminating circuit with a predetermined voltage when said reference beam timing signal is extracted and generating a voltage proportional to a voltage difference between said output of said frequency discriminating circuit and said predetermined voltage,
a control circuit for adjusting a current value to be injected to said local oscillating laser element through a laser driving circuit according to an output of said comparing circuit.

2. A system according to claim 1, wherein said timing generating circuit outputs a timing pulse corresponding to said reference beam timing signal.

3. A system according to claim 2, wherein
said first switch circuit supplies a reference current from said reference current generating circuit to said laser element only when said timing pulse is outputted and supplies a signal current from said signal current generating circuit to said laser element when said timing pulse is not outputted.

4. A system according to claim 1, further comprising:

a signal determining circuit for determining if an output voltage of said frequency discriminating circuit is a first voltage representative of a logical value 0 or a second voltage representative of a logical value 1, and outputting a first signal representative of said logical value 0 when said output voltage is said first voltage and outputting said second signal representative of said logical value 1 when said output voltage is said second voltage.

5. A system according to claim 4, further comprising:
a second switch circuit for switching the flow of said output of said frequency discriminating circuit into said signal determining circuit or said comparing circuit according to said output of said timing extracting circuit.

6. A system for transmitting information by modulating a light frequency or a phase of a coherent beam being propagated in free space, said system comprising:
a transmitter for transmitting a beam in the air, including
means for generating a signal beam by modulating the wavelength or the phase of said coherent beam according to a signal to be transmitted, and
means for radiating said signal beam as a spherical divergent light wave; and
a receiving device for receiving a beam transmitted in the air, including
a local oscillating laser element for generating a locally oscillated laser beam,
a mixing element for mixing a signal beam with said locally oscillated laser beam,
a light detection element for photoelectric-converting said mixed signal beam into an electrical signal,
a frequency discriminating circuit for converting a frequency of an output signal sent from said light detection element into a corresponding voltage,
a signal determining circuit for determining if said corresponding voltage is a first voltage representative of a logical value 0 or a second voltage representative of a logical value 1, and outputting a first signal representative of said logical value 0 when said corresponding voltage is said first voltage and outputting said second signal representative of said logical value I when said corresponding voltage is said second voltage,
a first average detecting circuit for taking an average of an output of said frequency discriminating circuit,
a second average detecting circuit for taking an average of an output of said signal determining circuit,
an operating circuit for receiving an output of said second average detecting circuit and constant set voltage and outputting a set light frequency of said locally oscillated laser beam,
a control circuit for outputting a voltage in order to keep a difference between said set light frequency of said logically oscillated laser beam and said average of the output of said frequency discriminating circuit, and
a laser driving circuit for adjusting a current value to be injected to said local oscillating laser element according to said output voltage of said control circuit.

7. A system for transmitting information by modulating a light frequency or a phase of a coherent beam being propagated in free space, said system comprising:
a transmitter for transmitting a beam in the air, including
a first mixer for mixing a first signal beam with a part of a locally oscillated laser beam said locally oscillated laser beam being transmitted by a transceiving device via air to the transmitter,
a first light detection element for photoelectric-converting said mixed first signal beam and detecting an a.c. component corresponding to a light frequency difference between said first locally oscillated laser beam and first signal beam,
a first frequency discriminating means for converting said a.c. component into a voltage,
a low pass filter for receiving said voltage and detecting a signal corresponding to an average light frequency difference between said first locally oscillated laser beam and a reference beam of said first signal beam,
a differential amplifying circuit for generating a voltage corresponding to a difference between said average light frequency difference and a voltage value set from an output side of said transmitting device, and
a control circuit for controlling a bias current to be injected a wavelength variable laser element in a manner to keep said generated voltage constant; and
said transceiving device for receiving a beam from said transmitter and for transmitting said locally oscillated laser beam, said transceiving device including
a local oscillating laser element for generating and transmitting said locally oscillated laser beam,
a second mixer for mixing a second signal beam with said locally oscillated laser beam,
a second light detection element for photoelectric-converting said mixed second signal beam into an electric signal,
a second frequency discriminating circuit for converting a frequency of an output signal sent from said second light detection element into a corresponding voltage, and
a signal determining circuit for determining if said corresponding voltage is a first voltage representative of a logical value 0 or a second voltage representative of a logical value 1, and outputting a first signal representative of said logical value 0 when said corresponding voltage is said first voltage and outputting a second signal representative of said logical value 1 when said corresponding voltage is said second voltage.

8. A system for transmitting information by modulating a light frequency or a phase of a coherent beam being propagated in free space, said system comprising:
a transmitter for transmitting a beam in the air, including
a semiconductor laser for generating a coherent beam of a first wavelength and a coherent beam of a second wavelength,
a control circuit coupled to said semiconductor laser, said control circuit for controlling output power of said semiconductor laser and for modulating an output of said semiconductor laser in accordance with a digital information to be transmitted by switching the wavelength of said semiconductor laser to equalize a time average of the wavelength of modulated signal for said distal information signal, and
a window for emitting said modulated signal; and
a receiver for receiving said modulated signal in the air, including
a polarizing filter for converting received modulated signal into a liner polarized beam,
a filter for filtering background light in said linear polarized beam and for passing a light having said second wavelength, a lens for condensing light from said filter to generate condensed light, a local oscillating semiconductor laser of a wavelength variable type for emitting a coherent beam, a light mixing element for mixing the condensed light with said coherent beam emitted from said local oscillating semiconductor and outputting a mixed signal output;

a light detecting element coupled to said mixing element for detecting a beat signal in the mixed signal output, and a signal processing circuit for amplifying and shaping said beat signal and for demodulating said information included in said modulated signal, said signal processing circuit comprising a delay element for delaying said beat signal and a low-pass filter for passing said beat signal from said delay element to output a constant voltage corresponding to a time averaged light frequency by varying said wavelength of said local oscillating semiconductor laser.

* * * * *